(12) United States Patent
Kanagawa

(10) Patent No.: US 12,548,550 B2
(45) Date of Patent: Feb. 10, 2026

(54) GENERATING METHOD, GENERATING PROGRAM, AND GENERATING DEVICE

(71) Applicant: NTT, Inc., Tokyo (JP)

(72) Inventor: Hiroki Kanagawa, Tokyo (JP)

(73) Assignee: NTT, Inc., Tokyo (JP)

( * ) Notice: Subject to any disclaimer, the term of this patent is extended or adjusted under 35 U.S.C. 154(b) by 140 days.

(21) Appl. No.: 18/576,322

(22) PCT Filed: Jul. 5, 2021

(86) PCT No.: PCT/JP2021/025237
§ 371 (c)(1),
(2) Date: Jan. 3, 2024

(87) PCT Pub. No.: WO2023/281555
PCT Pub. Date: Jan. 12, 2023

(65) Prior Publication Data
US 2024/0339105 A1    Oct. 10, 2024

(51) Int. Cl.
*G10L 13/06* (2013.01)
*G10L 25/30* (2013.01)

(52) U.S. Cl.
CPC .............. *G10L 13/06* (2013.01); *G10L 25/30* (2013.01)

(58) Field of Classification Search
CPC ................................ G10L 25/30; G10L 13/06
USPC ....................................................... 704/258
See application file for complete search history.

(56) References Cited

U.S. PATENT DOCUMENTS

| | | | |
|---|---|---|---|
| 11,790,884 B1 * | 10/2023 | Shakeri | G10L 21/007 704/258 |
| 12,288,566 B1 * | 4/2025 | Ganguly | G10L 21/0264 |
| 2003/0055640 A1 * | 3/2003 | Burshtein | G10L 15/144 704/235 |

(Continued)

FOREIGN PATENT DOCUMENTS

| | | | |
|---|---|---|---|
| JP | 2019045856 A | * | 3/2019 |
| WO | 2018048934 A1 | | 3/2018 |
| WO | 2019155054 A1 | | 8/2019 |

OTHER PUBLICATIONS

Lajos Hanzo; F. Clare A. Somerville; Jason P. Woodward, "Speech Signals and Introduction to Speech Coding," in Voice Compression and Communications: Principles and Applications for Fixed and Wireless Channels, IEEE, 2001, pp. 3-26, doi: 10.1109/9780470546871.ch1. (Year: 2001).*

(Continued)

*Primary Examiner* — Bharatkumar S Shah

(57) ABSTRACT

A generation device generates intermediate representation information of a subband signal based on an acoustic feature value of a speech waveform, and simultaneously generates a plurality of subband signals corresponding to a plurality of different times and a plurality of different bands by inputting the intermediate representation information to a plurality of probability distribution generation models that outputs information on subband signals corresponding to times and bands allocated respectively, the plurality of probability distribution generation models corresponding to the number of channels of the subband signals and the number of samples to be simultaneously generated; and generates the speech waveform based on the plurality of subband signals.

20 Claims, 17 Drawing Sheets

(56) References Cited

U.S. PATENT DOCUMENTS

| | | | |
|---|---|---|---|
| 2006/0085194 A1* | 4/2006 | Okutani | G10L 13/04 |
| | | | 704/258 |
| 2013/0238337 A1* | 9/2013 | Kamai | G10L 21/003 |
| | | | 704/258 |
| 2014/0163991 A1* | 6/2014 | Short | G10L 15/14 |
| | | | 704/258 |
| 2018/0075343 A1* | 3/2018 | van den Oord | G10L 15/16 |
| 2018/0174570 A1* | 6/2018 | Tamura | G10L 13/0335 |
| 2019/0189115 A1* | 6/2019 | Hori | G10L 15/22 |
| 2020/0401874 A1* | 12/2020 | Kalchbrenner | G06N 3/0442 |
| 2021/0014039 A1* | 1/2021 | Zhang | H04L 9/0618 |
| 2023/0169953 A1* | 6/2023 | Zhang | G06N 3/0442 |
| | | | 704/258 |
| 2023/0395061 A1* | 12/2023 | Biadsy | G10L 15/04 |
| 2025/0252958 A1* | 8/2025 | Chang | G10L 15/24 |

OTHER PUBLICATIONS

Kawahara et al. (1999) "Restructuring speech representations using a pitch-adaptive time-frequency smoothing and an instantaneous-frequency-based FO extraction: Possible role of a repetitive structure in sounds" Speech Communication, vol. 27, No. 3-4, pp. 187-207.

Morise et al. (2016) "World: a vocoder-based high-quality speech synthesis system for real-time applications" IEICE Transactions on Information and Systems, vol. E99-D, No. 7, pp. 1877-1884.

Valin et al. (2019) "LPCNET: Improving Neural Speech Synthesis through Linear Prediction" ICASSP 2019, May 12, 2019, pp. 5891-5895.

Yu et al. (2020) "DurIAN: Duration Informed Attention Network for Speech Synthesis" Interspeech 2020, Oct. 25, 2020, pp. 2027-2031.

* cited by examiner

GENERATING METHOD, GENERATING PROGRAM, AND GENERATING DEVICE

CROSS-REFERENCE TO RELATED APPLICATIONS

This application is a U.S. 371 Application of International Patent Application No. PCT/JP2021/025237, filed on 5 Jul. 2021, the disclosure of which is hereby incorporated herein by reference in its entirety.

TECHNICAL FIELD

The present invention relates to a generation method, a generation program, and a generation device.

BACKGROUND ART

In speech synthesis, a module that converts an acoustic feature value such as a spectrum or a pitch representing the height of voice into a speech waveform is called a vocoder. There are two major types of methods for implementing the vocoder. One is a method based on signal processing, and methods such as STRAIGHT and WORLD are well-known (for example, see Non Patent Literatures 1 and 2). In these methods, since conversion from the acoustic feature value to the speech waveform is represented by a mathematical model, learning is unnecessary and processing speed is high, but quality of an analyzed and re-synthesized speech is inferior to that of a natural speech.

As another method, a method (neural vocoder) based on a neural network represented by WaveNet has been devised (for example, see Patent Literature 1). This is capable of synthesizing a speech having a quality comparable to that of a natural speech, but is slower in operation than a vocoder of signal processing because of a large amount of calculation. Normally, a forward propagation of the neural network needs to be performed once to predict one speech sample, so that it is difficult to perform real-time operation if the neural vocoder is implemented as it is.

To reduce the amount of calculation of the neural vocoder, and particularly to cause the neural vocoder to perform real-time operation in a CPU, two approaches are mainly adopted. One is to reduce a calculation cost per forward propagation of the neural network, and there are WaveRNN (for example, Patent Literature 2) in which a huge convolutional neural network (CNN) used in WaveNet is replaced with a small-scale recurrent neural network (RNN), LPCNet (for example, Non Patent Literature 3) in which linear prediction analysis (LPC) that is knowledge of signal processing is utilized in a generation process for a speech waveform, and the like.

Another method is a method of reducing the number of forward propagations, and it is disclosed that the number of forward propagations can be reduced by changing the prediction target to a short sequence obtained by band division using a pseudo-quadrature mirror filter (Pseudo-QMF) called a subband signal instead of a speech waveform (for example, Non Patent Literature 4).

CITATION LIST

Patent Literature

Patent Literature 1: WO 2018/048934 A
Patent Literature 2: WO 2019/155054 A

Non Patent Literature

Non Patent Literature 1: Hideki Kawahara, Ikuyo Masuda-Katsuse and Alain de Cheveigne, "Restructuring speech representations using a pitch-adaptive time-frequency smoothing and an instantaneous-frequency-based F0 extraction: Possible role of a repetitive structure in sounds," Speech Communication, vol. 27, no. 3-4, pp. 187-207, 1999.

Non Patent Literature 2: Masanori Morise, Fumiya Yokomori, Kenji Ozawa, "WORLD: a Vocoder-Based High-Quality Speech Synthesis System for Real-Time Applications," IEICE transactions on information and systems, vol. E99-D, no. 7, pp. 1877-1884, 2016.

Non Patent Literature 3: Jean-Marc Valin and Jan Skoglund, "LPCNET: IMPROVING NEURAL SPEECH SYNTHESIS THROUGH LINEAR PREDICTION," Proc. ICASSP, 2019, pp. 5891-5895

Non Patent Literature 4: Chengzhu Yu, Heng Lu, Na Hu, Meng Yu, Chao Weng, Kun Xu, Peng Liu, Deyi Tuo, Shiyin Kang, Guangzhi Lei, Dan Su, Dong Yu, "DurIAN: Duration Informed Attention Network for Speech Synthesis", Proc. INTERSPEECH 2020, pp. 2027-2031, 2020

SUMMARY OF INVENTION

Technical Problem

In Non Patent Literature 4, Cited Literature 2 is improved, and a subband signal of one sample is used instead of a speech waveform of one sample to predict a subband signal of the next time. In this case, when subband representation is performed using B channels, the sequence length can be shortened to 1/B, and the number of pure propagation times can be reduced to 1/B. However, since samples are generated one by one based on past samples based on an autoregressive structure such as RNN, it is not possible to increase the speed up to B times or more.

The present invention has been made in view of the above, and an object is to provide a generation method, a generation program, and a generation device capable of generating a speech waveform at a high speed from an acoustic feature value.

Solution to Problem

In order to solve the above-described problems and achieve the object, a computer includes: an intermediate representation generation process of generating intermediate representation information of a subband signal based on an acoustic feature value of a speech waveform; a subband signal generation process of simultaneously generating a plurality of subband signals corresponding to a plurality of different times and a plurality of different bands by inputting the intermediate representation information to a plurality of probability distribution generation models that outputs information on subband signals corresponding to times and bands allocated respectively, the plurality of probability distribution generation models corresponding to the number of channels of the subband signals and the number of samples to be simultaneously generated; and a speech waveform generation process of generating the speech waveform based on the plurality of subband signals.

Advantageous Effects of Invention

According to the present invention, a speech waveform can be generated at high speed from an acoustic feature value.

DESCRIPTION OF EMBODIMENTS

Hereinafter, examples of a generation method, a generation program, and a generation device disclosed in the present application will be described in detail with reference to the drawings. Note that the present invention is not limited to the example.

Example 1

Figure 1:
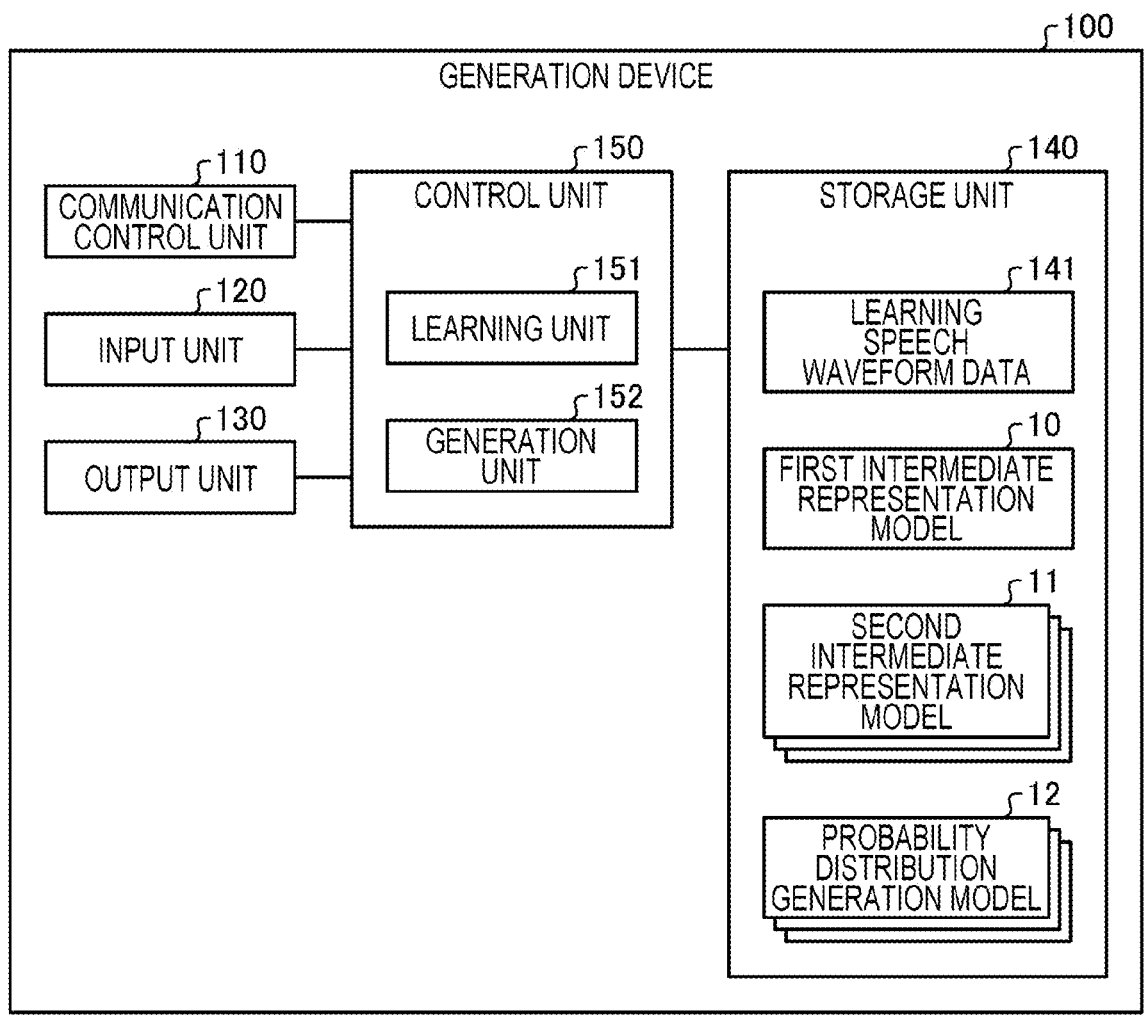
FIG. 1 is a functional block diagram illustrating a configuration of a generation device according to Example 1.

First, a configuration example of a generation device according to Example 1 will be described. FIG. 1 is a functional block diagram illustrating a configuration of a generation device according to Example 1. As illustrated in FIG. 1, a generation device 100 includes a communication control unit 110, an input unit 120, an output unit 130, a storage unit 140, and a control unit 150.

The communication control unit 110 is realized by a network interface card (NIC) or the like, and controls communication between an external apparatus and the control unit 150 via a telecommunication line such as a local area network (LAN) or the Internet.

The input unit 120 is realized by using input devices such as a keyboard and a mouse, and inputs various kinds of instruction information such as a processing start to the control unit 150 in response to input operation of an operator.

The output unit 130 is an output device that outputs information acquired from the control unit 150, and is realized by a display device such as a liquid crystal display, a printing device such as a printer, or the like.

The storage unit 140 includes learning speech waveform data 141, a first intermediate representation model 10, a second intermediate representation model 11, and a probability distribution generation model 12. The storage unit 140 is realized by a semiconductor memory element such as a random access memory (RAM) or a flash memory, or a storage device such as a hard disk or an optical disk.

The learning speech waveform data 141 includes data of a plurality of speech waveforms for learning. The learning speech waveform data 141 is used in a case where the first intermediate representation model 10, the second intermediate representation model 11, and the probability distribution generation model 12 are learned.

The first intermediate representation model 10 is a model that outputs an intermediate representation m of the acoustic feature value in a case where the acoustic feature value calculated from the speech waveform is input. The first intermediate representation model 10 corresponds to, for example, a neural network (NN), CNN, RNN, WaveRNN, or the like. In the following description, the intermediate representation m of the acoustic feature value is appropriately referred to as "intermediate representation m".

The acoustic feature value corresponds to spectrum information such as a spectrogram and mel cepstrum of a speech waveform and prosody information such as a fundamental frequency and a pitch frequency.

The intermediate representation of the acoustic feature value is information obtained by extending the sequence length of the acoustic feature value to be the same as the number of speech samples. As a method of realizing the first intermediate representation model 10 that generates the intermediate representation m, there is a method of arranging vectors of acoustic feature values corresponding to one frame by the number of samples and extending the vectors. In addition, in a case where the first intermediate representation model 10 is realized by WaveRNN, in order to consider continuity of the front and rear frames, a method of extending while converting the feature value using a one-dimensional CNN or a two-dimensional CNN is adopted.

The second intermediate representation model 11 is a model that outputs an intermediate representation $x_t$ of the subband signal in a case where the intermediate representation m is input. As described later, there is a plurality of second intermediate representation models 11. In the following description, the intermediate representation $x_t$ of the subband signal is appropriately referred to as "intermediate representation $x_t$". Symbol t of the intermediate representation $x_t$ is a time index. For example, $x_{t=-1,0}$ means a vector including information at time t=−1 and t=0. Here, the intermediate representation $x_{t=-1,0}$ is information corresponding to the initial value of the intermediate representation $x_t$.

Figure 2:
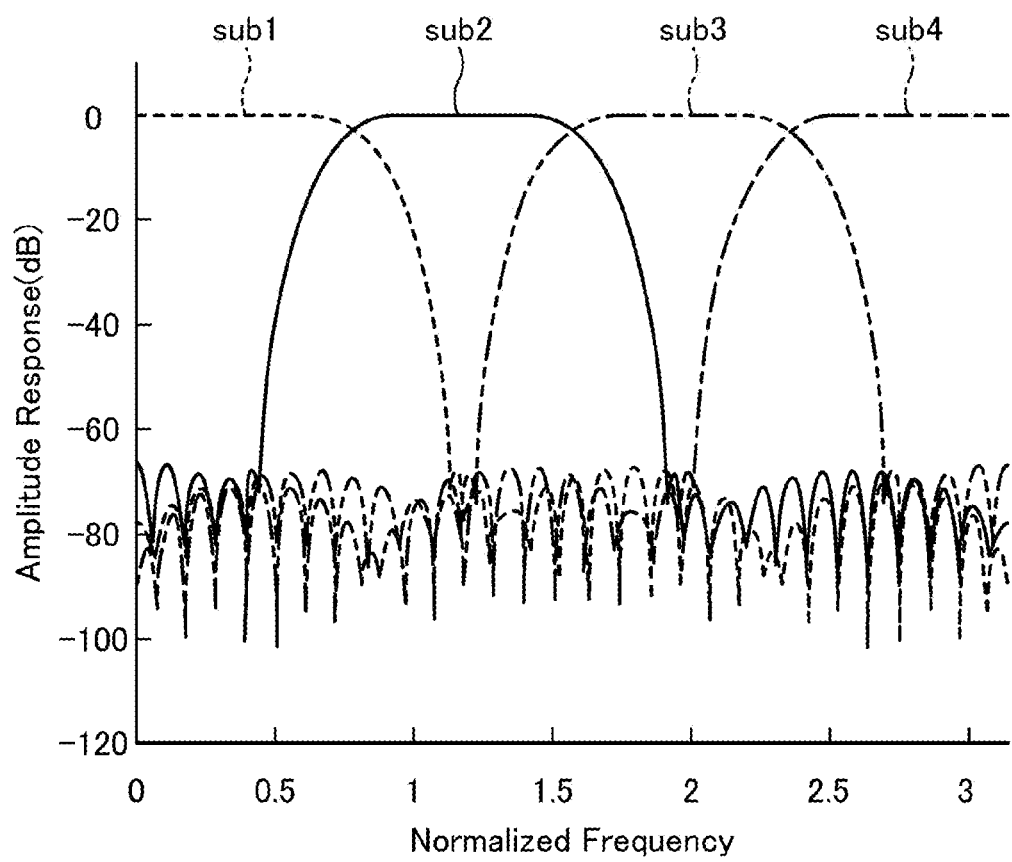
FIG. 2 is a diagram illustrating an example of subband signals.

FIG. 2 is a diagram illustrating an example of subband signals. The vertical axis in FIG. 2 corresponds to amplitude response, and the horizontal axis corresponds to normalized frequency. FIG. 2 illustrates a case where four subband signals sub1, sub2, sub3, and sub4 are generated by filtering the speech signal (full-band signal). The subband signal sub1 is a low-frequency subband signal. The subband signal sub2 is a low-frequency to mid-frequency subband signal. The subband signal sub3 is a mid-frequency to high-frequency subband signal. The subband signal sub4 is a high-frequency subband signal.

The probability distribution generation model 12 is a model that outputs probability distributions $y_{t,b}$ of the subband signals in a case where the intermediate representation $x_t$ is input. As described later, there are a plurality of probability distribution generation models 12. Symbol t of the probability distributions $y_{t,b}$ is a time index, and symbol b is an index of a channel of a subband signal. The probability distributions $y_{t,b}$ are generation probability of the speech waveform sample value. In a case where the speech waveform is represented by a discrete value such as a μ-law signal, a categorical distribution can be used as the probability distributions $y_{t,b}$. In a case where the speech waveform is represented by continuous values, Gaussian distribution, beta distribution, and mixed logistic distribution can be used as the probability distributions $y_{t,b}$.

In FIG. 1, the control unit 150 includes a learning unit 151 and a generation unit 152. The control unit 150 corresponds to a central processing unit (CPU) or the like.

The learning unit 151 executes learning of the first intermediate representation model 10, the second intermediate representation model 11, and the probability distribution generation model 12 using the learning speech waveform data 141.

The generation unit 152 generates a speech waveform from the acoustic feature value using the learned first intermediate representation model 10, second intermediate representation model 11, and probability distribution generation model 12. The generation unit 152 may acquire the information of the acoustic feature value from the input unit 120 or from an external apparatus via the communication control unit 110.

Figure 3:
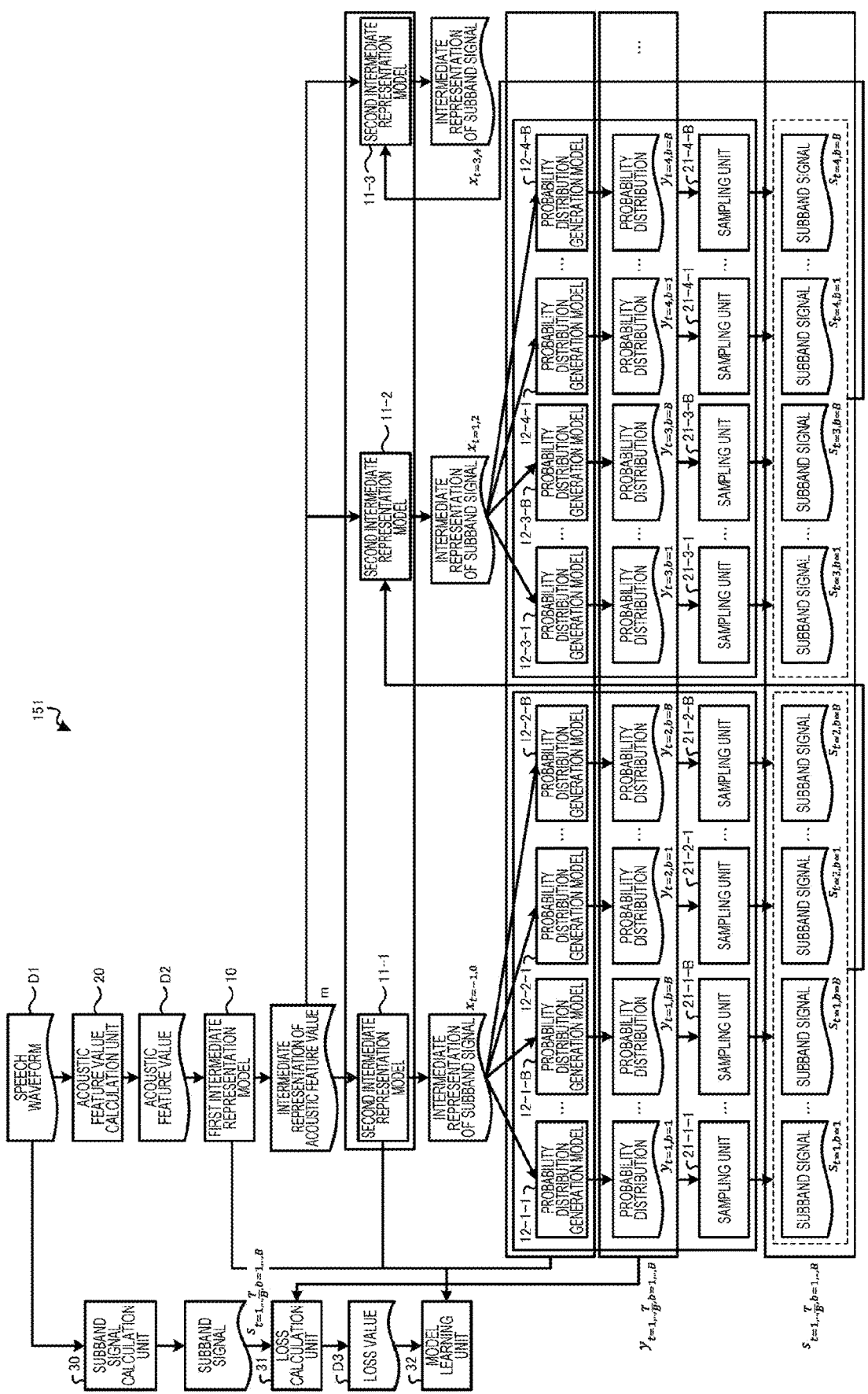
FIG. 3 is a diagram for describing a learning unit according to Example 1.

Next, the learning unit 151 illustrated in FIG. 1 will be specifically described. FIG. 3 is a diagram for describing a learning unit according to Example 1. As illustrated in FIG. 3, the learning unit 151 includes an acoustic feature value calculation unit 20, the first intermediate representation model 10, the plurality of second intermediate representation models 11-$n$ (n=1 to T/B −1), a plurality of probability distribution generation models 12-$t$-$b$ (t=1, ..., T/B, b=1, ..., B), a sampling unit 21-$t$-$b$, a subband signal calculation unit 30, a loss calculation unit 31, and a model learning unit 32. Here, the sequence length of the speech is represented by T, the number of channels of the subband signal is represented by B, and the number of samples of the subband signal is represented by N (=2).

The learning unit 151 inputs a speech waveform D1 stored in the learning speech waveform data 141 to an acoustic feature value calculation unit 20. The acoustic feature value calculation unit 20 calculates an acoustic feature value D2 based on the speech waveform D1. The acoustic feature value calculation unit 20 inputs the acoustic feature value D2 to the first intermediate representation model 10.

The first intermediate representation model 10 outputs the intermediate representation m of the acoustic feature value in a case where the acoustic feature value D2 is input. The first intermediate representation model 10 outputs the intermediate representation m to the second intermediate representation models 11-1 to 11-$n$. The first intermediate representation model 10 outputs the gradient information to the model learning unit 32.

Each of the second intermediate representation models 11-1 to 11-$n$ outputs the intermediate representation $x_t$ of the subband signal in a case where the intermediate representation m is input. For example, the second intermediate representation model 11-1 calculates the intermediate representation $x_{t=-1,0}$, and outputs it to the probability distribution generation models 12-1-1 to 12-2-B. Note that the second intermediate representation models 11-2 to 11-$n$ further use subband signals $s_{t,b}$ at the previous time when calculating the intermediate representation $x_t$ of the subband signal. Symbol t of the subband signals $s_{t,b}$ is a time index, and symbol b is an index of a channel of a subband signal.

The second intermediate representation model 11-2 calculates the intermediate representation $x_{t=1,2}$, and outputs it to the probability distribution generation models 12-3-1 to 12-4-B. The second intermediate representation model 11-3 calculates the intermediate representation $x_{t=3,4}$, and outputs it to the probability distribution generation models 12-5-1 to 12-6-B (not illustrated).

In the following description, in a case where the second intermediate representation models 11-1 to 11-$n$ are not distinguished, they are collectively referred to as the second intermediate representation model 11. The second intermediate representation model 11 outputs the gradient information to the model learning unit 32.

Each of the probability distribution generation models 12-$t$-$b$ outputs the probability distributions $y_{t,b}$ in a case where the intermediate representation $x_t$ is input. For example, the probability distribution generation model 12-1-1 outputs the probability distributions $y_{t=1,b=1}$ to the sampling unit 21-1-1. Although not illustrated, the probability distribution generation models 12-1-2 to 12-1-(B-1) output the probability distributions $y_{t,b}$ to the subordinate sampling units 21-1-2 to 21-1-(B-1). The probability distribution generation model 12-1-B outputs the probability distributions $y_{t=1,b=B}$ to the sampling unit 21-1-B.

The probability distribution generation model 12-2-1 outputs the probability distributions $y_{t=2,b=1}$ to the sampling unit 21-2-1. Although not illustrated, the probability distribution generation models 12-2-2 to 12-2-(B-1) output the probability distributions $y_{t,b}$ to the subordinate sampling units 21-2-2 to 21-2-(B-1). The probability distribution generation model 12-2-B outputs the probability distributions $y_{t=2, b=B}$ to the sampling unit 21-2-B.

The probability distribution generation model 12-3-1 outputs the probability distributions $y_{t=3,b=1}$ to the sampling unit 21-3-1. Although not illustrated, the probability distribution generation models 12-3-2 to 12-3-(B-1) output the probability distributions $y_{t,b}$ to the subordinate sampling units 21-3-2 to 21-3-(B-1). The probability distribution generation model 12-3-B outputs the probability distributions $y_{t=3,b=B}$ to the sampling unit 21-3-B.

The probability distribution generation model 12-4-1 outputs the probability distributions $y_{t=4,b=1}$ to the sampling unit 21-4-1. Although not illustrated, the probability distribution generation models 12-4-2 to 12-4-(B-1) output the probability distributions $y_{t,b}$ to the subordinate sampling units 21-4-2 to 21-4-(B-1). The probability distribution generation model 12-4-B outputs the probability distributions $y_{t=3,b=B}$ to the sampling unit 21-4-B.

Although descriptions of other probability distribution generation models are omitted, in a case where the intermediate representation $x_t$ is input, the probability distributions $y_{t,b}$ are output to the subordinate sampling unit. In the following description, in a case where each of the probability distribution generation models 12-t-b are not distinguished, they are collectively referred to as the probability distribution generation model 12. The probability distribution generation model 12 outputs the gradient information to the model learning unit 32. The probability distribution generation model 12 outputs the probability distributions $y_{t=1 \ to \ T/B, b=1 \ to \ B}$ to the loss calculation unit 31.

Each of the sampling units 21-t-b calculates the subband signals $s_{t,b}$ in a case where the probability distributions $y_{t,b}$ are input. Note that, in a case where each of the probability distribution generation models 12-t-b directly predicts the subband signal, the learning unit 151 may not use each of the sampling units 21-t-b.

The sampling unit 21-1-1 calculates the subband signals $s_{t=1, b=1}$. Although not illustrated, the sampling units 21-1-2 to 21-1-(B-1) calculate the corresponding subband signals $s_{t,b}$. The sampling unit 21-1-B calculates the subband signals $s_{t=1, b=B}$.

The sampling unit 21-2-1 calculates the subband signals $s_{t=2, b=1}$. Although not illustrated, the sampling units 21-2-2 to 21-2-(B-1) calculate the corresponding subband signals $s_{t,b}$. The sampling unit 21-2-B calculates the subband signals $s_{t=2, b=B}$.

As described above, the subband signals $s_{t=1, b=1 \ to \ B}$ are calculated by the sampling units 21-1-1 to 21-1-B. The subband signals $s_{t=2, b=1}$ to B are calculated by the sampling units 21-2-1 to 21-2-B. The subband signals $s_{t=1, b=1 \ to \ B}$, and the subband signals $s_{t=2, b=1 \ to \ B}$ are input to the second intermediate representation model 11-2.

That is, subband signals ($s_{t=1, b=1 \ to \ B}$, and $s_{t=2, b=1 \ to \ B}$) corresponding to B×N (N=2) are generated from one intermediate representation $x_{t=-1,0}$ by a set of the probability distribution generation models 12-1-1 to 12-1-B and the sampling units 21-1-1 to 21-1-B and a set of the and the sampling units 21-2-1 to 21-2-B.

The sampling unit 21-3-1 calculates the subband signals $s_{t=3, b=1}$. Although not illustrated, the sampling units 21-3-2 to 21-3-(B-1) calculate the corresponding subband signals $s_{t,b}$. The sampling unit 21-3-B calculates the subband signals $s_{t=3, b=B}$.

The sampling unit 21-4-1 calculates the subband signals $s_{t=4, b=1}$. Although not illustrated, the sampling units 21-4-2 to 21-4-(B-1) calculate the corresponding subband signals $s_{t,b}$. The sampling unit 21-4-B calculates the subband signals $s_{t=4, b=B}$.

As described above, the subband signals $s_{t=3, b=1 \ to \ B}$ are calculated by the sampling units 21-3-1 to 21-3-B. The subband signals $s_{t=4, b=1 \ to \ B}$ are calculated by the sampling units 21-4-1 to 21-4-B. The subband signals $s_{t=3, b=1 \ to \ B}$, and the subband signals $s_{t=4, b=1 \ to \ B}$ are input to the second intermediate representation model 11-3.

That is, subband signals ($s_{t=3, b=1 \ to \ B}$, and $s_{t=4, b=1 \ to \ B}$) corresponding to B×N (N=2) are generated from one intermediate representation $x_{t=1,2}$ by a set of the probability distribution generation models 12-3-1 to 12-3-B and the sampling units 21-3-1 to 21-3-B and a set of the probability distribution generation models 12-4-1 to 12-4-B and the sampling units 21-4-1 to 21-4-B.

Although descriptions of other sampling units are omitted, the subband signals $s_{t,b}$ are calculated in a case where the probability distributions $y_{t,b}$ are input, respectively. The subband signals $s_{t=1 \ to \ T/B, b=1 \ to \ B}$ are output from each of the sampling units 21-t-b.

Next, description of the subband signal calculation unit 30 will be made. The subband signal calculation unit 30 calculates the subband signals $s_{t=1 \ to \ T/B, b=1 \ to \ B}$ from the speech waveform D1. As the subband signal calculation unit 30, a quadrature mirror filter (QMF) or a pseudo-quadrature mirror filter (PQMF) can be used. By using the quadrature mirror filter or the pseudo-quadrature mirror filter, conversion into a subband signal in which the sequence length of the input speech waveform D1 is shortened to 1/B is performed.

The subband signal calculation unit 30 outputs the subband signals $s_{t=1 \ to \ T/B, b=1 \ to \ B}$ to the loss calculation unit 31.

The loss calculation unit 31 calculates a loss value D3 based on the subband signals $s_{t=1 \ to \ T/B, b=1 \ to \ B}$ and the probability distributions $y_{t=1 \ to \ T/B, b=1 \ to \ B}$. For example, the loss value D3 is a value indicating an error between the subband signal predicted from the probability distributions $y_{t=1 \ to \ T/B, b=1 \ to \ B}$ and the subband signals $s_{t=1 \ to \ T/B, b=1 \ to \ B}$.

In a case where the categorical distribution is used for the probability distribution, the loss calculation unit 31 calculates the loss value D3 using the cross entropy. In a case where the Gaussian distribution, the beta distribution, and the mixed logistic distribution are used for the probability distribution, the loss calculation unit 31 calculates the loss value D3 using the negative log likelihood.

The loss calculation unit 31 outputs the loss value D3 to the model learning unit 32.

The model learning unit 32 acquires the loss value D3, the gradient information of the first intermediate representation model 10, the gradient information of the second intermediate representation model 11, and the gradient information of the probability distribution generation model 12, and performs machine learning on the parameter of the first intermediate representation model 10, the parameter of the second intermediate representation model 11, and the parameter of the probability distribution generation model 12 to reduce the loss value D3. For example, the model learning unit 32 executes machine learning using an error back propagation algorithm.

Each processing unit included in the learning unit 151 repeatedly executes the above processing on the plurality of speech waveforms D1 included in the learning speech waveform data 141 to obtain the learned first intermediate representation model 10, second intermediate representation model 11, and probability distribution generation model 12.

Figure 4:
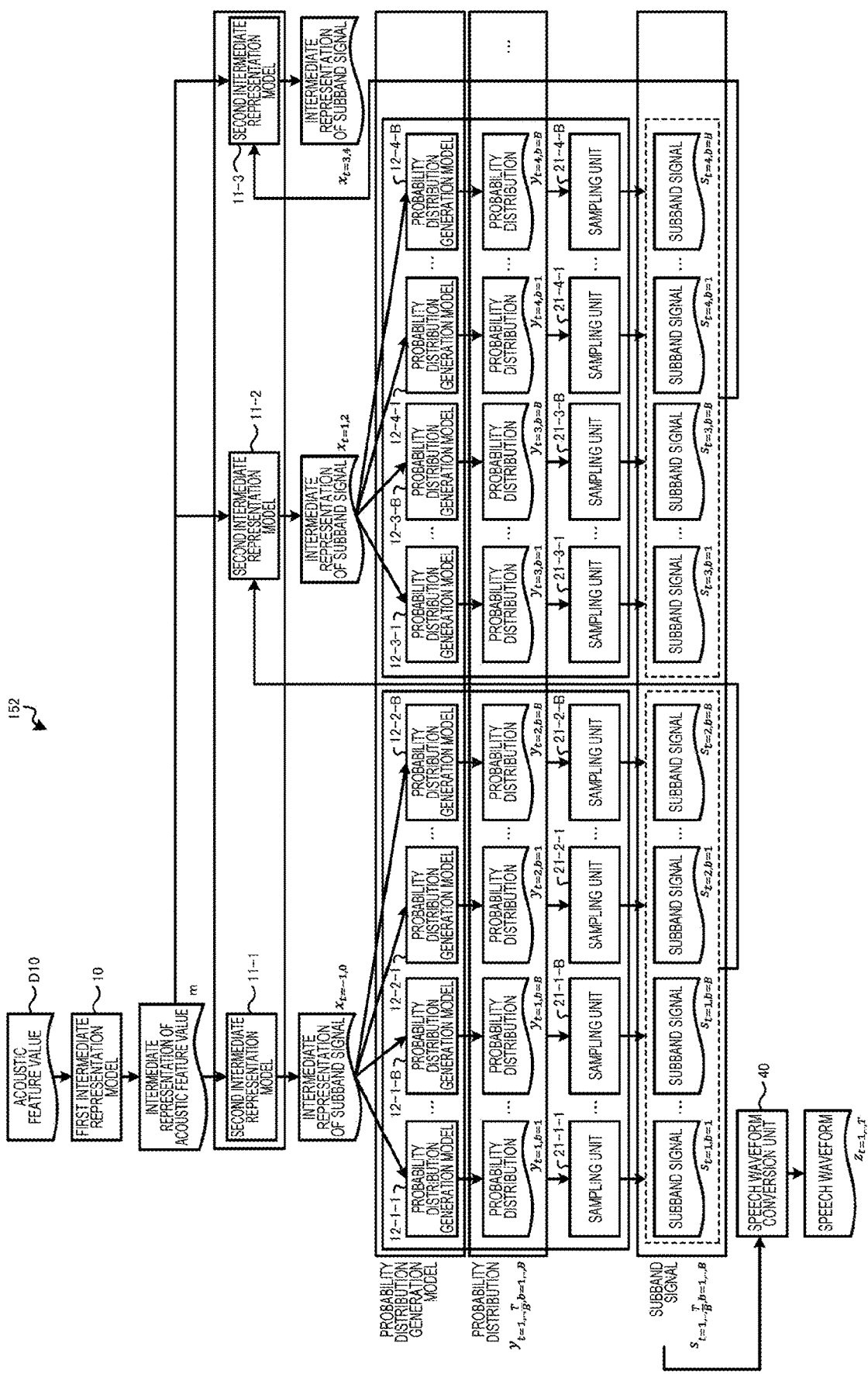
FIG. 4 is a diagram for describing a generation unit according to Example 1.

Next, the generation unit 152 illustrated in FIG. 1 will be specifically described. FIG. 4 is a diagram for describing a generation unit according to Example 1. As illustrated in FIG. 4, the generation unit 152 includes the first intermediate representation model 10, the plurality of second intermediate representation models 11-n (n=1 to T/B−1), the plurality of probability distribution generation models 12-t-b (t=1, . . . , T/B, b=1, . . . , B), the sampling unit 21-t-b, and a speech waveform conversion unit 40. Here, the sequence length of the speech is represented by T, the number of channels of the subband signal is represented by B, and the number of samples of the subband signal is represented by N (=2).

Similarly to the case of FIG. 3, in a case where the second intermediate representation models 11-1 to 11-n are not distinguished, they are collectively referred to as the second intermediate representation model 11. In a case where the probability distribution generation models 12-t-b are not distinguished, they are collectively referred to as the probability distribution generation model 12.

It is assumed that the first intermediate representation model 10, the second intermediate representation model 11, and the probability distribution generation model 12 have been learned by the learning unit 151.

The generation unit 152 inputs an acoustic feature value D10 to the first intermediate representation model 10. The first intermediate representation model 10 outputs the intermediate representation m of the acoustic feature value in a case where the acoustic feature value D10 is input. The first intermediate representation model 10 outputs the intermediate representation m to the second intermediate representation models 11-1 to 11-$n$.

The second intermediate representation model 11 outputs the intermediate representation $x_t$ of the subband signal to the probability distribution generation model 12 in a case where the intermediate representation m is input. The description regarding the second intermediate representation model 11 is similar to the description regarding each of the second intermediate representation models 11-1 to 11-$n$ performed in FIG. 3.

The probability distribution generation model 12 outputs the probability distributions $y_{t,b}$ to each of the sampling units 21-$t$-$b$ in a case where the intermediate representation $x_t$ is input. The description regarding the probability distribution generation model 12 is similar to the description regarding each of the probability distribution generation models 12-$t$-$b$ performed in FIG. 3.

The sampling units 21-$t$-$b$ calculate the subband signals $s_{t,b}$ in a case where the probability distributions $y_{t,b}$ are input. Each of the sampling units 21-$t$-$b$ outputs the subband signals $s_{t=1\ to\ T/B, b=1\ to\ B}$ to the speech waveform conversion unit 40.

The speech waveform conversion unit 40 calculates speech waveforms $z_{t=1\ to\ T}$ based on the subband signals $s_{t=1\ to\ T/B, b=1\ to\ B}$. The speech waveform conversion unit 40 converts the subband signal into an audio waveform by inverse conversion of the quadrature mirror filter or the pseudo-quadrature mirror filter.

Figure 5:
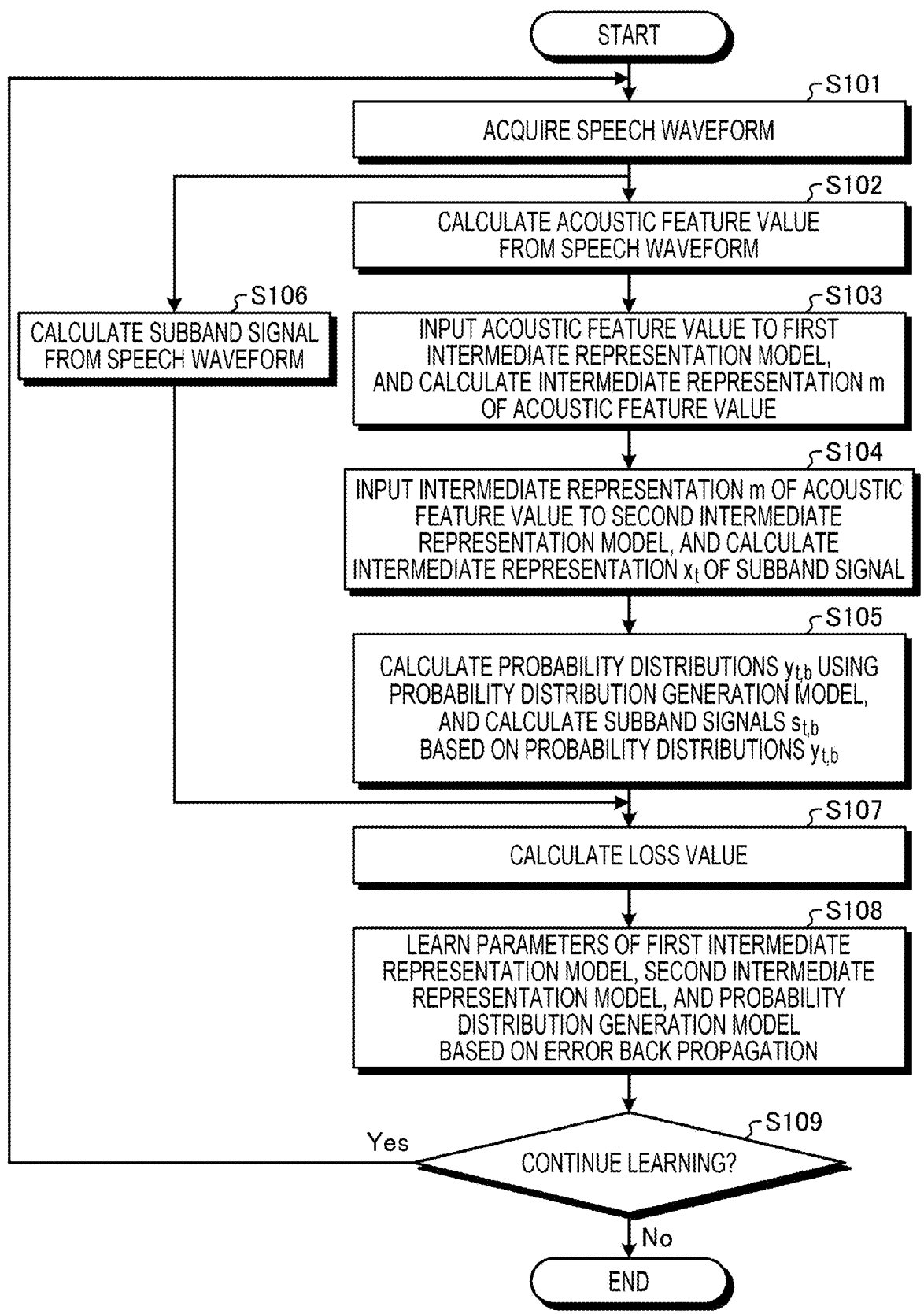
FIG. 5 is a flowchart illustrating a processing procedure at a time of learning of the generation device according to Example 1.

Next, an example of a processing procedure of the generation device 100 according to Example 1 will be described. FIG. 5 is a flowchart illustrating a processing procedure at a time of learning of the generation device according to Example 1. As illustrated in FIG. 5, the learning unit 151 of the generation device 100 acquires a speech waveform from the learning speech waveform data 141 (step S101).

The acoustic feature value calculation unit 20 of the learning unit 151 calculates an acoustic feature value from the speech waveform (step S102). The learning unit 151 inputs the acoustic feature value to the first intermediate representation model 10 and calculates the intermediate representation m of the acoustic feature value (step S103).

The learning unit 151 inputs the intermediate representation m of the acoustic feature value to the second intermediate representation model 11 and calculates the intermediate representation $x_t$ of the subband signal (step S104). The learning unit 151 calculates the probability distributions $y_{t,b}$ using the probability distribution generation model 12, and calculates the subband signals $s_{t,b}$ based on the probability distributions $y_{t,b}$ (step S105).

On the other hand, the subband signal calculation unit 30 of the learning unit 151 calculates the subband signal based on the speech waveform (step S106).

The loss calculation unit 31 of the learning unit 151 calculates a loss value based on the subband signals $s_{t=1\ to\ T/B, b=1\ to\ B}$ and the probability distributions $y_{t=1\ to\ T/B, b=1\ to\ B}$ (step S107).

The model learning unit 32 of the learning unit 151 learns the parameters of the first intermediate representation model 10, the second intermediate representation model 11, and the probability distribution generation model 12 based on the error back propagation (step S108).

In a case where the learning is continued (step S109, Yes), the learning unit 151 proceeds to step S101. On the other hand, in a case where the learning is not continued (step S109, No), the learning unit 151 ends the processing.

Figure 6:
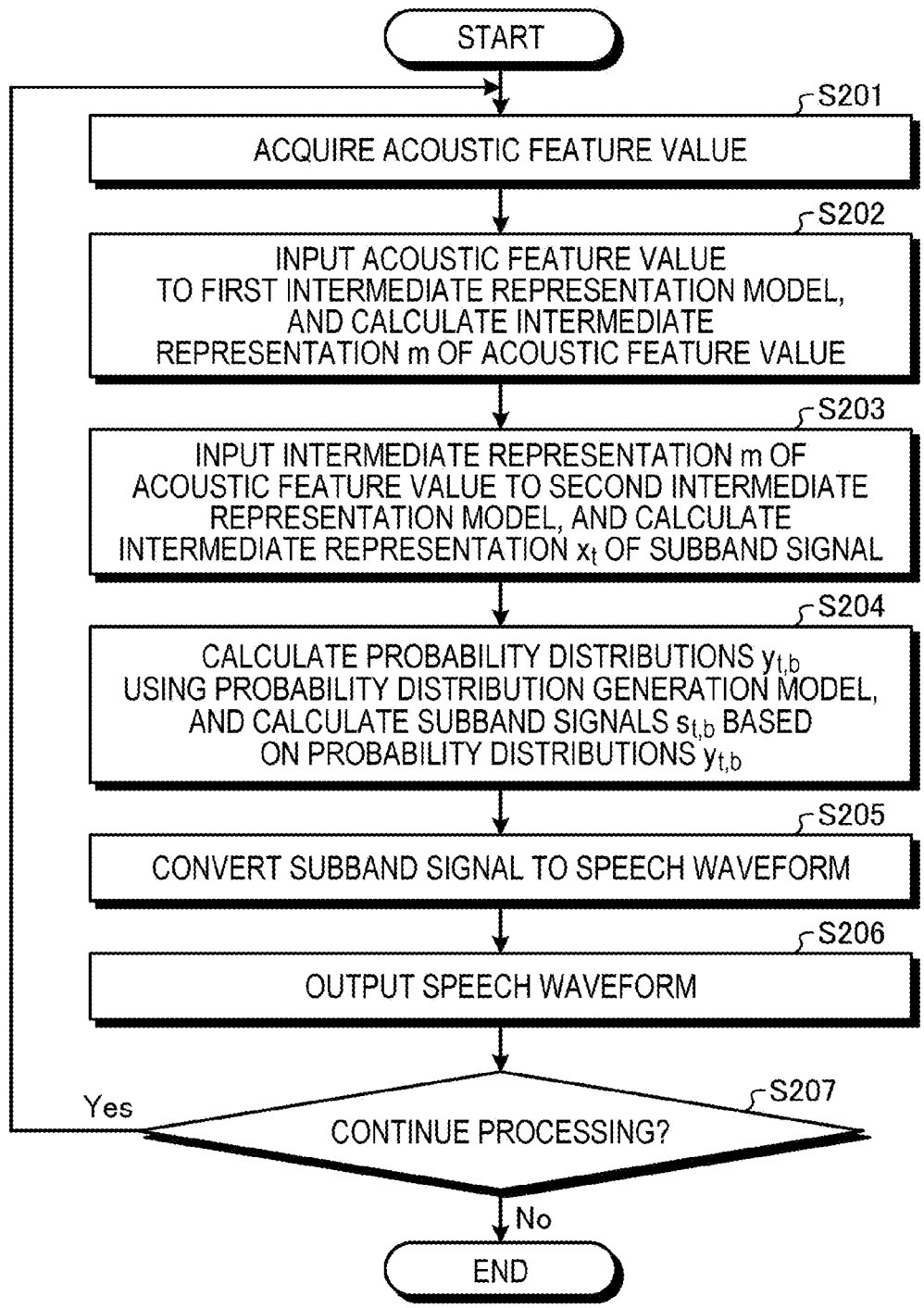
FIG. 6 is a flowchart illustrating a processing procedure at a time of generation of the generation device according to Example 1.

FIG. 6 is a flowchart illustrating a processing procedure at a time of generation of the generation device according to Example 1. As illustrated in FIG. 6, the generation unit 152 of the generation device 100 acquires an acoustic feature value (step S201). The generation unit 152 inputs the acoustic feature value to the first intermediate representation model 10 and calculates the intermediate representation m of the acoustic feature value (step S202).

The generation unit 152 inputs the intermediate representation m of the acoustic feature value to the second intermediate representation model 11 and calculates the intermediate representation $x_t$ of the subband signal (step S203). The generation unit 152 calculates the probability distributions $y_{t,b}$ using the probability distribution generation model 12, and calculates the subband signals $s_{t,b}$ based on the probability distributions $y_{t,b}$ (step S204).

The speech waveform conversion unit 40 of the generation unit 152 calculates the speech waveforms $z_{t=1\ to\ T}$ based on the subband signals $s_{t=1\ to\ T/B, b=1\ to\ B}$ (step S205). The generation unit 152 outputs the speech waveforms $z_{t=1\ to\ T}$ (step S206).

In a case where the processing is continued (step S207, Yes), the generation unit 152 proceeds to step S201. In a case where the processing is not continued (step S207, No), the generation unit 152 ends the processing.

Next, effects of the generation device 100 according to Example 1 will be described. The generation device 100 can speed up the processing of generating the speech waveform from the acoustic feature value up to B×N times by simultaneously generating N samples of the B subband signals by one forward propagation.

For example, subband signals ($s_{t=1, b=1\ to\ B}$, and $s_{t=2, b=1\ to\ B}$) corresponding to B×N (N=2) are generated from one intermediate representation $x_{t=-1, 0}$ by a set of the probability distribution generation models 12-1-1 to 12-1-B and the sampling units 21-1-1 to 21-1-B and a set of the and the sampling units 21-2-1 to 21-2-B.

In addition, by speeding up the processing of generating the speech waveform from the acoustic feature value, the number of times of forward propagation of the neural vocoder can be reduced, and the learning and inference speed are improved. In addition, it is effective for widening the range of devices on which the neural vocoder can be mounted and for real-time operation at a high sampling frequency.

Example 2

Figure 7:
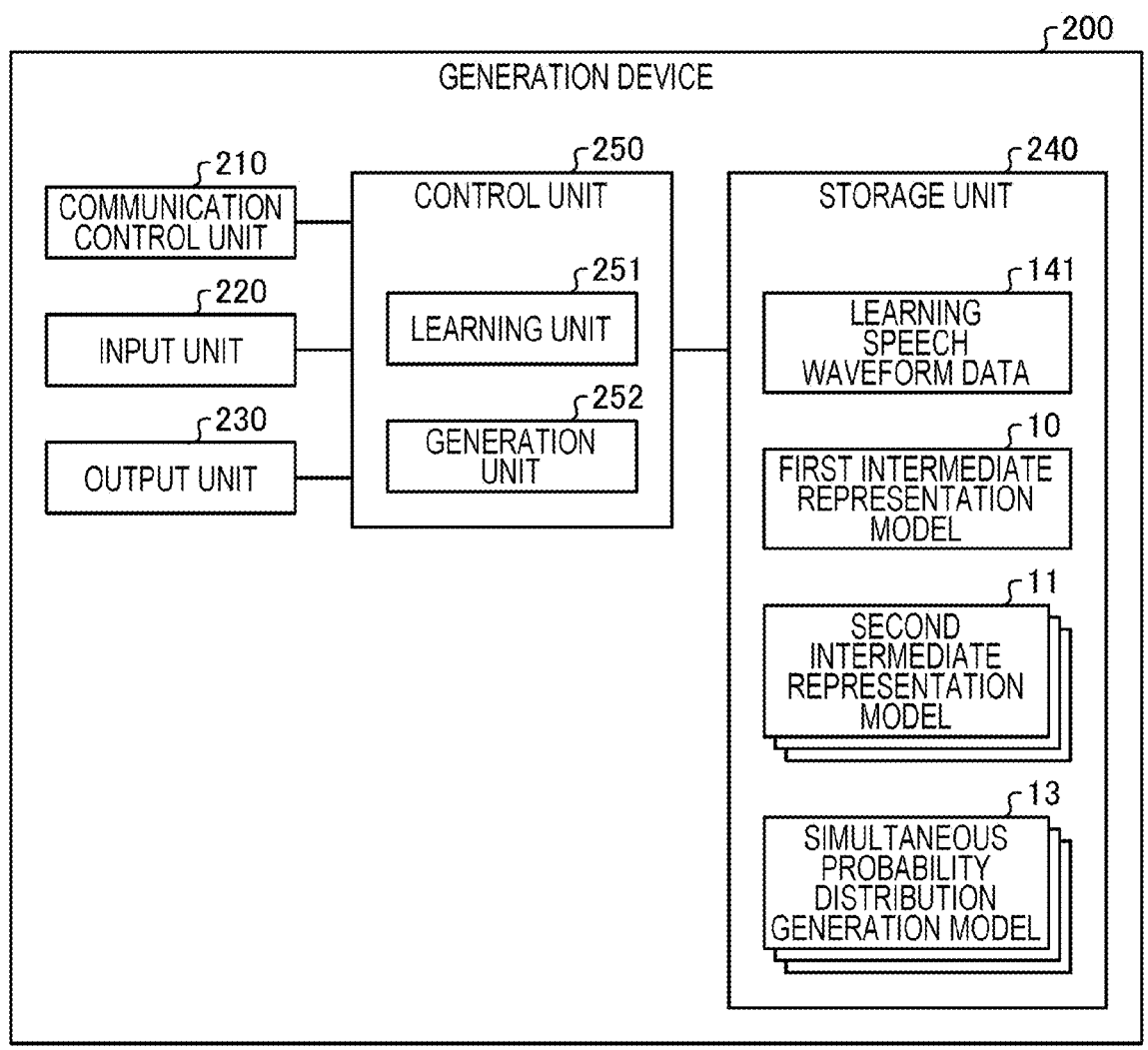
FIG. 7 is a functional block diagram illustrating a configuration of a generation device according to Example 2.

First, a configuration example of a generation device according to Example 2 will be described. FIG. 7 is a functional block diagram illustrating a configuration of a generation device according to Example 2. As illustrated in FIG. 7, a generation device 200 includes a communication control unit 210, an input unit 220, an output unit 230, a storage unit 240, and a control unit 250.

The description regarding the communication control unit 210, the input unit 220, and the output unit 230 is similar to the description regarding the communication control unit 110, the input unit 120, and the output unit 130 described in Example 1.

The storage unit 240 includes the learning speech waveform data 141, the first intermediate representation model 10, the second intermediate representation model 11, and a simultaneous probability distribution generation model 13. The storage unit 240 is realized by, for example, a semiconductor memory element such as a RAM or a flash memory, or a memory device such as a hard disk or an optical disk.

The learning speech waveform data 141, the first intermediate representation model 10, and the second intermediate representation model 11 are similar to the description regarding the learning speech waveform data 141, the first intermediate representation model 10, and the second intermediate representation model 11 described in Example 1.

The simultaneous probability distribution generation model 13 is a model that simultaneously estimates subband signals of channels b=1 to B. A dimension corresponding to each subband signal from the simultaneous probability obtained by the simultaneous probability distribution generation model 13 is set as a probability distribution.

Here, the probability distributions $y_{t=t,b}$ output from the probability distribution generation model 12 that simultaneously generates N samples described in Example 1 are expressed by Expression (1).

[Math. 1]
$$P(s_{t=\tau,b}|s_{t=1,b=1,\ldots,B}, \cdots s_{t=\tau-N,b=1,\ldots,B}, m) \quad (1)$$

Since the simultaneous probability distribution generation model 13 of Example 2 simultaneously estimates the subband signals of the channels b=1 to B, the probability distributions $y_{t=1,b=1 \text{ to } B}$ output from the simultaneous probability distribution generation model 13 are expressed by Expression (2). As a result, it is possible to estimate the probability distribution in consideration of the relationship between the subbands.

[Math. 2]
$$P(s_{t=\tau,b=1,\ldots,B}|s_{t=1,b=1,\ldots,B}, \cdots s_{t=\tau-N,b=1,\ldots,B}, m) \quad (2)$$

In FIG. 7, the control unit 250 includes a learning unit 251 and a generation unit 252. The control unit 250 corresponds to a CPU or the like.

The learning unit 251 executes learning of the first intermediate representation model 10, the second intermediate representation model 11, and the simultaneous probability distribution generation model 13 using the learning speech waveform data 141.

The generation unit 252 generates a speech waveform from the acoustic feature value using the learned first intermediate representation model 10, second intermediate representation model 11, and simultaneous probability distribution generation model 13. The generation unit 252 may acquire the information of the acoustic feature value from the input unit 220 or from an external apparatus via the communication control unit 210.

Figure 8:
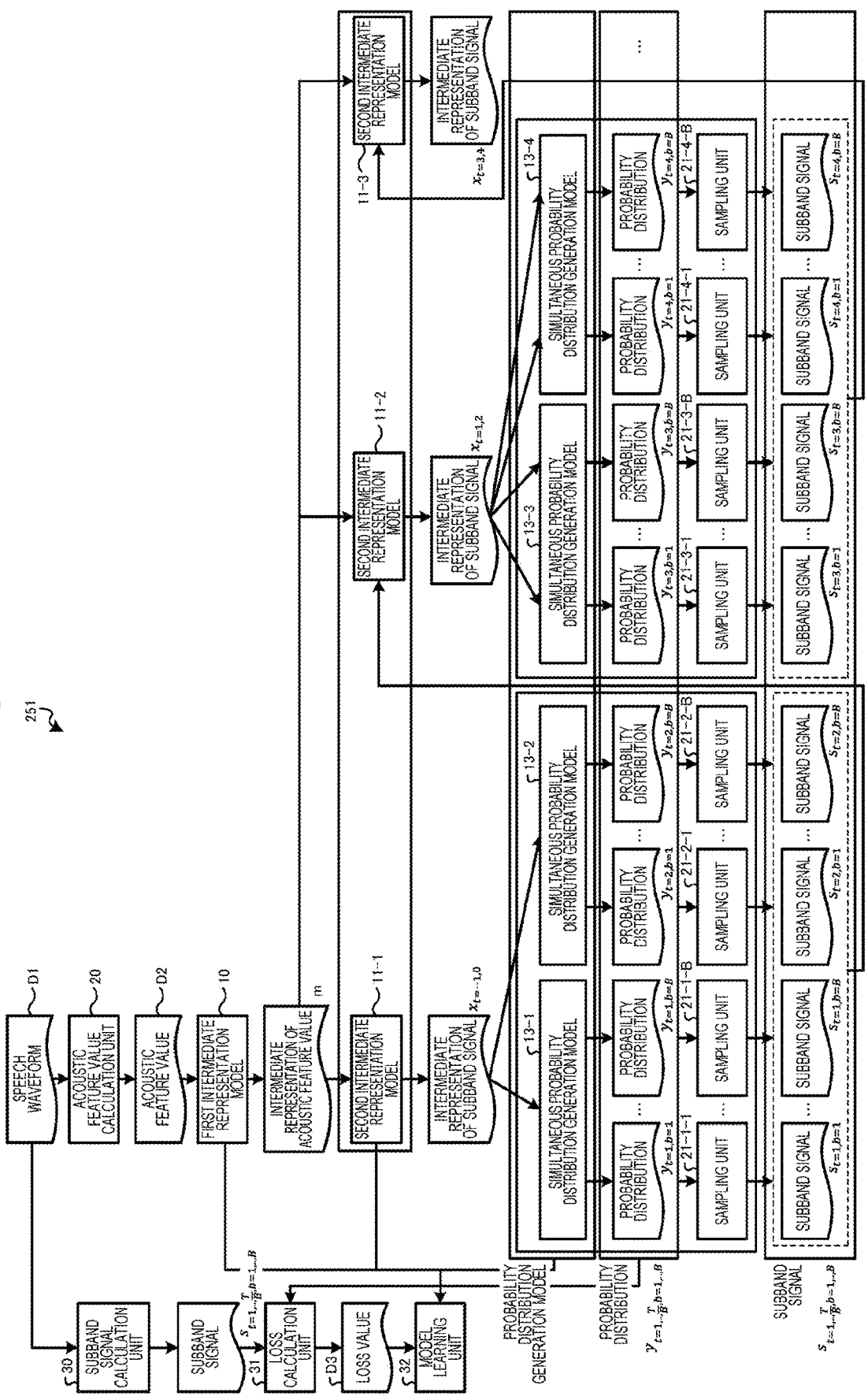
FIG. 8 is a diagram for describing a learning unit according to Example 2.

Next, the learning unit 251 illustrated in FIG. 7 will be specifically described. FIG. 8 is a diagram for describing a learning unit according to Example 2. As illustrated in FIG. 8, the learning unit 251 includes the acoustic feature value calculation unit 20, the first intermediate representation model 10, the plurality of second intermediate representation models 11-n (n=1 to T/B −1), a plurality of simultaneous probability distribution generation models 13-t (t=1, . . . , T/B), the sampling unit 21-t-b, the subband signal calculation unit 30, the loss calculation unit 31, and the model learning unit 32. Here, the sequence length of the speech is represented by T, the number of channels of the subband signal is represented by B, and the number of samples of the subband signal is represented by N (=2).

The learning unit 251 inputs the speech waveform D1 stored in the learning speech waveform data 141 to the acoustic feature value calculation unit 20. The acoustic feature value calculation unit 20 calculates an acoustic feature value D2 based on the speech waveform D1. The acoustic feature value calculation unit 20 inputs the acoustic feature value D2 to the first intermediate representation model 10.

The first intermediate representation model 10 outputs the intermediate representation m of the acoustic feature value in a case where the acoustic feature value D2 is input. The first intermediate representation model 10 outputs the intermediate representation m to the second intermediate representation models 11-1 to 11-n. The first intermediate representation model 10 outputs the gradient information to the model learning unit 32.

Each of the second intermediate representation models 11-1 to 11-n outputs the intermediate representation $x_t$ of the subband signal in a case where the intermediate representation m is input. For example, the second intermediate representation model 11-1 calculates the intermediate representation $x_{t=-1,0}$, and outputs it to the simultaneous probability distribution generation models 13-1 to 13-2. Note that the second intermediate representation models 11-2 to 11-n further use subband signals $s_{t,b}$ at the previous time when calculating the intermediate representation $x_t$ of the subband signal.

The second intermediate representation model 11-2 calculates the intermediate representation $x_{t=1,2}$, and outputs it to the simultaneous probability distribution generation models 12-3 and 12-4. The second intermediate representation model 11-3 calculates the intermediate representation $x_{t=3,4}$, and outputs it to the simultaneous probability distribution generation models 12-5 to 12-6 (not illustrated).

In the following description, in a case where the second intermediate representation models 11-1 to 11-n are not distinguished, they are collectively referred to as the second intermediate representation model 11.

Each of the simultaneous probability distribution generation models 13-t outputs the probability distributions $y_{t,b=1 \text{ to } B}$ in a case where the intermediate representation $x_t$ is input. For example, the simultaneous probability distribution generation model 13-1 outputs the probability distributions $y_{t=1,b=1 \text{ to } B}$ to the sampling units 21-1-1 to 21-1-B.

The simultaneous probability distribution generation model 13-1 may output the probability distribution for each channel to the sampling units 21-1-1 to 21-1-B, respectively, or the sampling units 21-1-1 to 21-1-B may sample and acquire the corresponding probability distribution from the simultaneous probability distribution. For example, if a multivariate distribution is used, it is possible to sample the corresponding probability distribution from the simultaneous probability distribution. The same applies to other simultaneous probability distribution generation models described below. The simultaneous probability distribution generation model 13-2 outputs the probability distributions $y_{t=2,b=1\ to\ B}$ to the sampling units 21-2-1 to 21-2-B.

The simultaneous probability distribution generation model 13-3 outputs the probability distributions $y_{t=3,b=1\ to\ B}$ to the sampling units 21-3-1 to 21-3-B.

The simultaneous probability distribution generation model 13-4 outputs the probability distributions $y_{t=4,b=1\ to\ B}$ to the sampling units 21-4-1 to 21-4-B.

Although descriptions of other simultaneous probability distribution generation models are omitted, in a case where the intermediate representation $x_t$ is input, the probability distributions $y_{t,b=1\ to\ B}$ are output to the subordinate sampling unit. In the following description, in a case where the simultaneous probability distribution generation models 13-$t$ are not distinguished, they are collectively referred to as the simultaneous probability distribution generation model 13. The simultaneous probability distribution generation model 13 outputs the gradient information to the model learning unit 32. The simultaneous probability distribution generation model 13 outputs the probability distributions $y_{t=1\ to\ T/B,b=1\ to\ B}$ to the loss calculation unit 31.

Each of the sampling units 21-$t$-$b$ calculates the subband signals $s_{t,b}$ in a case where the probability distributions $y_{t,b}$ are input. Note that, in a case where each of the simultaneous probability distribution generation models 13 directly predicts the subband signal, the learning unit 251 may not use each of the sampling units 21-$t$-$b$.

Other descriptions regarding each of the sampling units 21-$t$-$b$ are similar to those of each of the sampling units 21-$t$-$b$ described in Example 1.

The subband signal calculation unit 30 calculates the subband signals $s_{t=1\ to\ T/B,b=1\ to\ B}$ from the speech waveform D1. The subband signal calculation unit 30 outputs the subband signals $s_{t=1\ to\ T/B,b=1\ to\ B}$ to the loss calculation unit 31. Other descriptions regarding the subband signal calculation unit 30 are similar to those of Example 1.

The loss calculation unit 31 calculates a loss value D3 based on the subband signals $s_{t=1\ to\ T/B,b=1\ to\ B}$ and the probability distributions $y_{t=1\ to\ T/B,b=1\ to\ B}$. The loss calculation unit 31 outputs the loss value D3 to the model learning unit 32. Other descriptions regarding the loss calculation unit 31 are similar to those of Example 1.

The model learning unit 32 acquires the loss value D3, the gradient information of the first intermediate representation model 10, the gradient information of the second intermediate representation model 11, and the gradient information of the simultaneous probability distribution generation model 13, and performs machine learning on the parameter of the first intermediate representation model 10, the parameter of the second intermediate representation model 11, and the parameter of the simultaneous probability distribution generation model 13 to reduce the loss value D3. For example, the model learning unit 32 executes machine learning using an error back propagation algorithm.

Each processing unit included in the learning unit 251 repeatedly executes the above processing on the plurality of speech waveforms D1 included in the learning speech waveform data 141 to obtain the learned first intermediate representation model 10, second intermediate representation model 11, and simultaneous probability distribution generation model 13.

Figure 9:
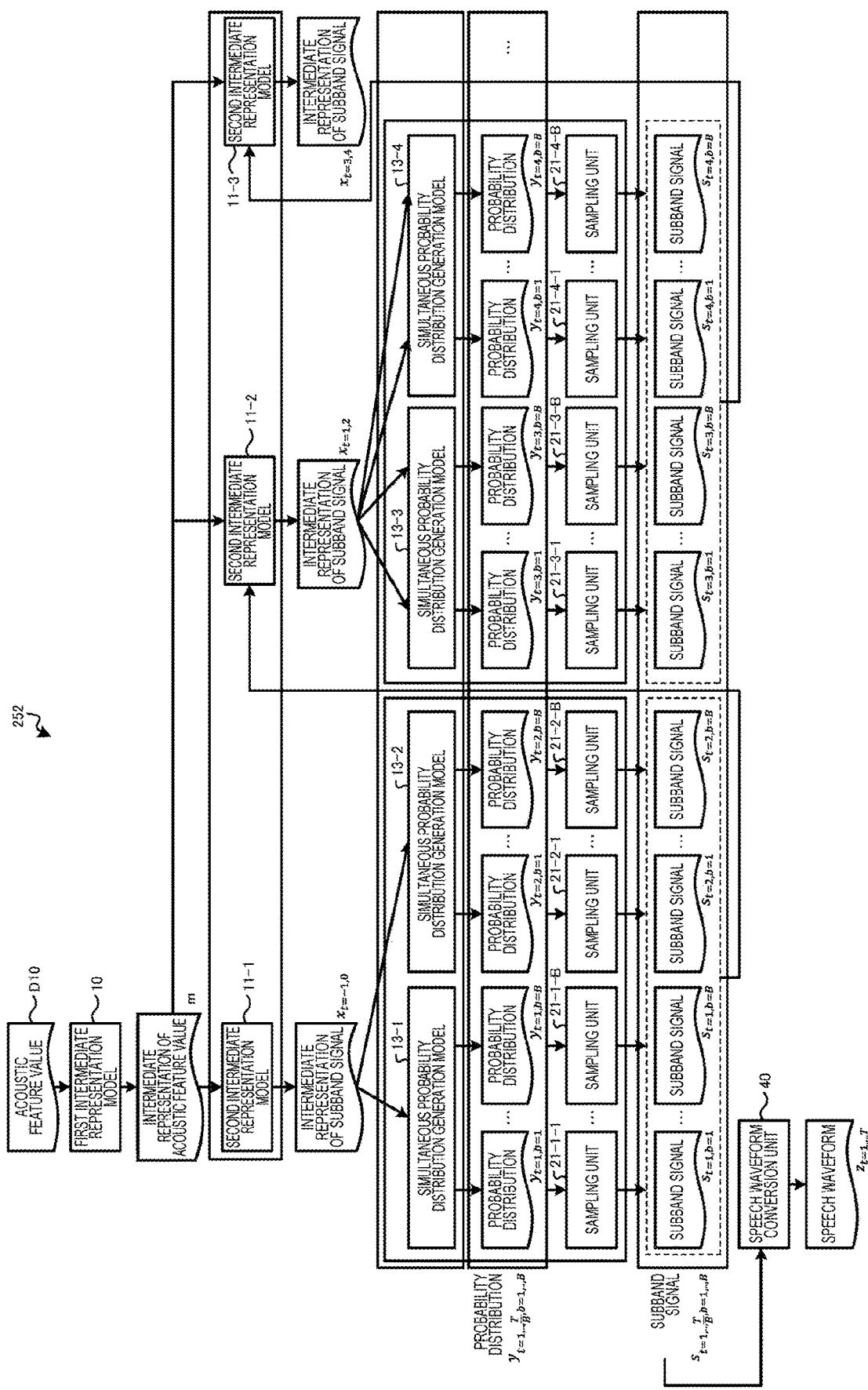
FIG. 9 is a diagram for describing a generation unit according to Example 2.

Next, the generation unit 252 illustrated in FIG. 7 will be specifically described. FIG. 9 is a diagram for describing a generation unit according to Example 2. As illustrated in FIG. 9, the generation unit 252 includes the first intermediate representation model 10, the plurality of second intermediate representation models 11-$n$ (n=1 to T/B −1), the plurality of simultaneous probability distribution generation models 13-$t$ (t=1, . . . , T/B), the sampling unit 21-$t$-$b$, and the speech waveform conversion unit 40. Here, the sequence length of the speech is represented by T, the number of channels of the subband signal is represented by B, and the number of samples of the subband signal is represented by N (=2).

Similarly to the case of FIG. 8, in a case where the second intermediate representation models 11-1 to 11-$n$ are not distinguished, they are collectively referred to as the second intermediate representation model 11. In a case where the simultaneous probability distribution generation models 13-$t$ are not distinguished, they are collectively referred to as the simultaneous probability distribution generation model 13.

It is assumed that the first intermediate representation model 10, the second intermediate representation model 11, and the simultaneous probability distribution generation model 13 have been learned by the learning unit 251.

The generation unit 252 inputs the acoustic feature value D10 to the first intermediate representation model 10. The first intermediate representation model 10 outputs the intermediate representation m of the acoustic feature value in a case where the acoustic feature value D10 is input. The first intermediate representation model 10 outputs the intermediate representation m to the second intermediate representation models 11-1 to 11-$n$.

The second intermediate representation model 11 outputs the intermediate representation $x_t$ of the subband signal to the simultaneous probability distribution generation model 13 in a case where the intermediate representation m is input. The description regarding the second intermediate representation model 11 is similar to the description regarding each of the second intermediate representation models 11-1 to 11-$n$ performed in FIG. 8.

The simultaneous probability distribution generation model 13 outputs the probability distributions $y_{t,b=1\ to\ B}$ to each of the sampling units 21-$t$-$b$ in a case where the intermediate representation $x_t$ is input. The description regarding the simultaneous probability distribution generation model 13 is similar to the description regarding each of the probability distribution generation models 12-$t$ performed in FIG. 8.

The sampling units 21-$t$-$b$ calculate the subband signals $s_{t,b}$ in a case where the probability distributions $y_{t,b}$ are input. Each of the sampling units 21-$t$-$b$ outputs the subband signals $s_{t=1\ to\ T/B,b=1\ to\ B}$ to the speech waveform conversion unit 40.

The speech waveform conversion unit 40 calculates speech waveforms $z_{t=1\ to\ T}$ based on the subband signals $s_{t=1\ to\ T/B,b=1\ to\ B}$. The speech waveform conversion unit 40 converts the subband signal into an audio waveform by inverse conversion of the quadrature mirror filter or the pseudo-quadrature mirror filter.

Figure 10:
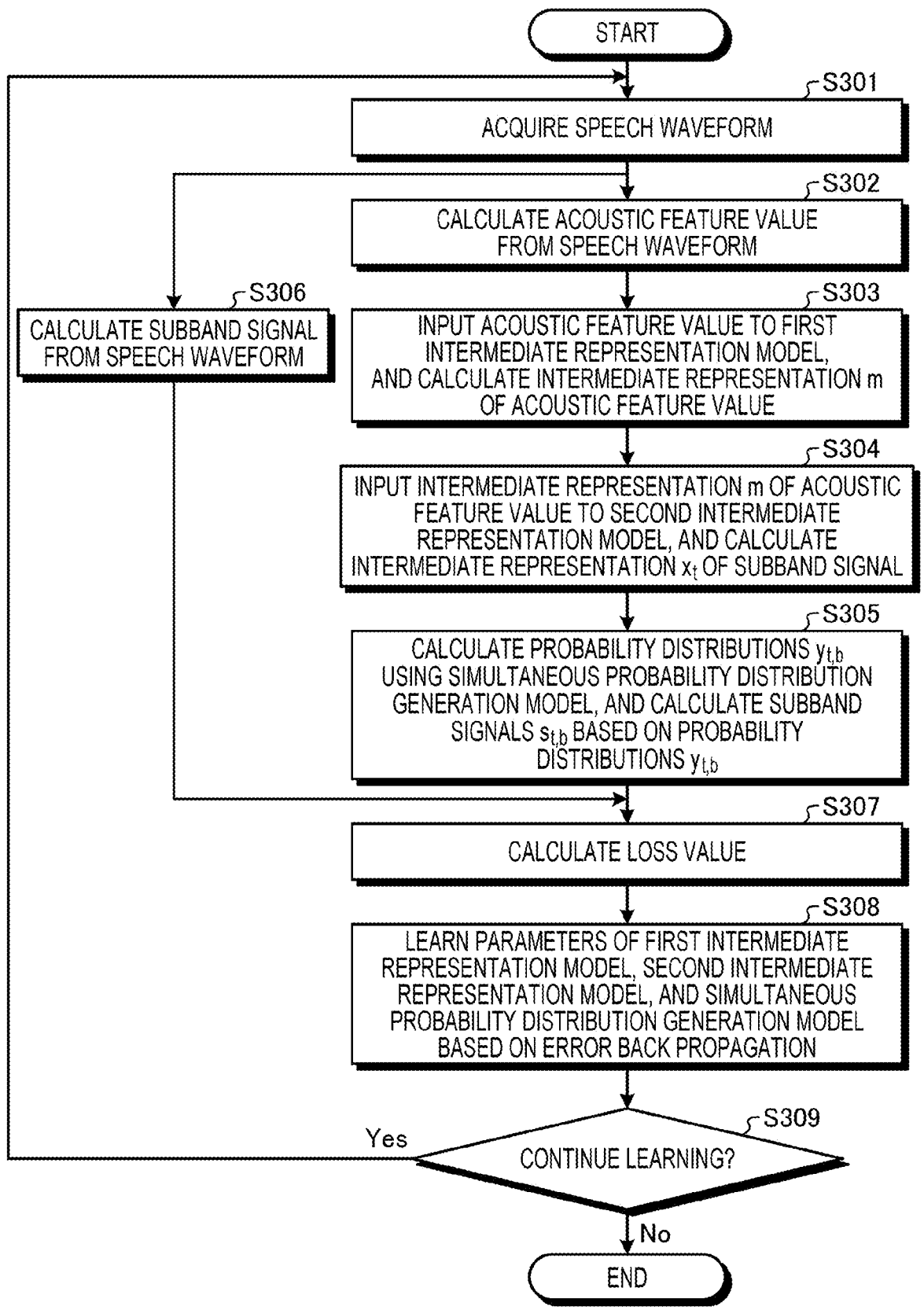
FIG. 10 is a flowchart illustrating a processing procedure at a time of learning of the generation device according to Example 2.

Next, an example of a processing procedure of the generation device 200 according to Example 2 will be described. FIG. 10 is a flowchart illustrating a processing procedure at a time of learning of the generation device according to Example 2. As illustrated in FIG. 10, the learning unit 251 of the generation device 200 acquires a speech waveform from the learning speech waveform data 141 (step S301).

The acoustic feature value calculation unit 20 of the learning unit 251 calculates an acoustic feature value from the speech waveform (step S302). The learning unit 251 inputs the acoustic feature value to the first intermediate representation model 10 and calculates the intermediate representation m of the acoustic feature value (step S303).

The learning unit 251 inputs the intermediate representation m of the acoustic feature value to the second intermediate representation model 11 and calculates the intermediate representation $x_t$ of the subband signal (step S304). The learning unit 251 calculates the probability distributions $y_{t,b}$ using the simultaneous probability distribution generation model 13, and calculates the subband signals $s_{t,b}$ based on the probability distributions $y_{t,b}$ (step S305).

On the other hand, the subband signal calculation unit 30 of the learning unit 251 calculates the subband signal based on the speech waveform (step S306).

The loss calculation unit 31 of the learning unit 251 calculates a loss value based on the subband signals $s_{t=1 \text{ to } T/B, b=1 \text{ to } B}$ and the probability distributions $y_{t=1 \text{ to } T/B, b=1 \text{ to } B}$ (step S307).

The model learning unit 32 of the learning unit 251 learns the parameters of the first intermediate representation model 10, the second intermediate representation model 11, and the simultaneous probability distribution generation model 13 based on the error back propagation (step S308).

In a case where the learning is continued (step S309, Yes), the learning unit 251 proceeds to step S301. On the other hand, in a case where the learning is not continued (step S309, No), the learning unit 251 ends the processing.

Figure 11:
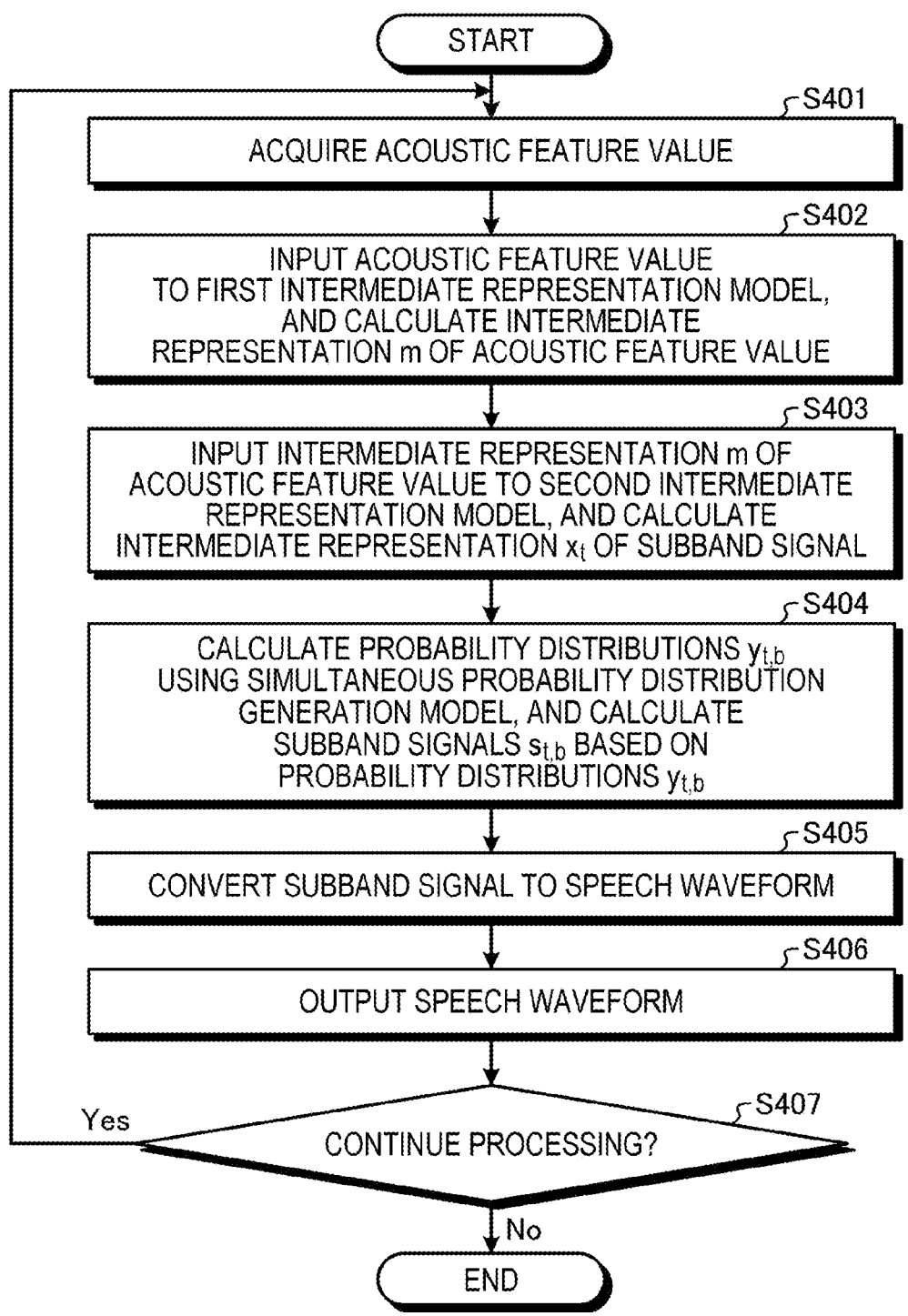
FIG. 11 is a flowchart illustrating a processing procedure at a time of generation of the generation device according to Example 2.

FIG. 11 is a flowchart illustrating a processing procedure at a time of generation of the generation device according to Example 2. As illustrated in FIG. 11, the generation unit 252 of the generation device 200 acquires an acoustic feature value (step S401). The generation unit 252 inputs the acoustic feature value to the first intermediate representation model 10 and calculates the intermediate representation m of the acoustic feature value (step S402).

The generation unit 252 inputs the intermediate representation m of the acoustic feature value to the second intermediate representation model 11 and calculates the intermediate representation $x_t$ of the subband signal (step S403). The generation unit 252 calculates the probability distributions $y_{t,b}$ using the simultaneous probability distribution generation model 13, and calculates the subband signals $s_{t,b}$ based on the probability distributions $y_{t,b}$ (step S404).

The speech waveform conversion unit 40 of the generation unit 252 calculates the speech waveforms $z_{t=1 \text{ to } T}$ based on the subband signals $s_{t=1 \text{ to } T/B, b=1 \text{ to } B}$ (step S405). The generation unit 252 outputs the speech waveforms $z_{t=1 \text{ to } T}$ (step S406).

In a case where the processing is continued (step S407, Yes), the generation unit 252 proceeds to step S401. In a case where the processing is not continued (step S407, No), the generation unit 252 ends the processing.

Next, effects of the generation device 200 according to Example 2 will be described. The generation device 200 can speed up the processing of generating the speech waveform from the acoustic feature value up to B×N times by simultaneously generating N samples of the B subband signals by one forward propagation. In addition, the generation device 200 can estimate the probability distribution in consideration of the relationship between the subbands by using the simultaneous probability distribution generation model 13. Since the probability distribution calculation is simultaneously executed for a plurality of bands, the number of times of calling the matrix computation instruction can be set to 1/B as compared with Example 1, and efficiency can also be improved in terms of processing.

Example 3

Figure 12:
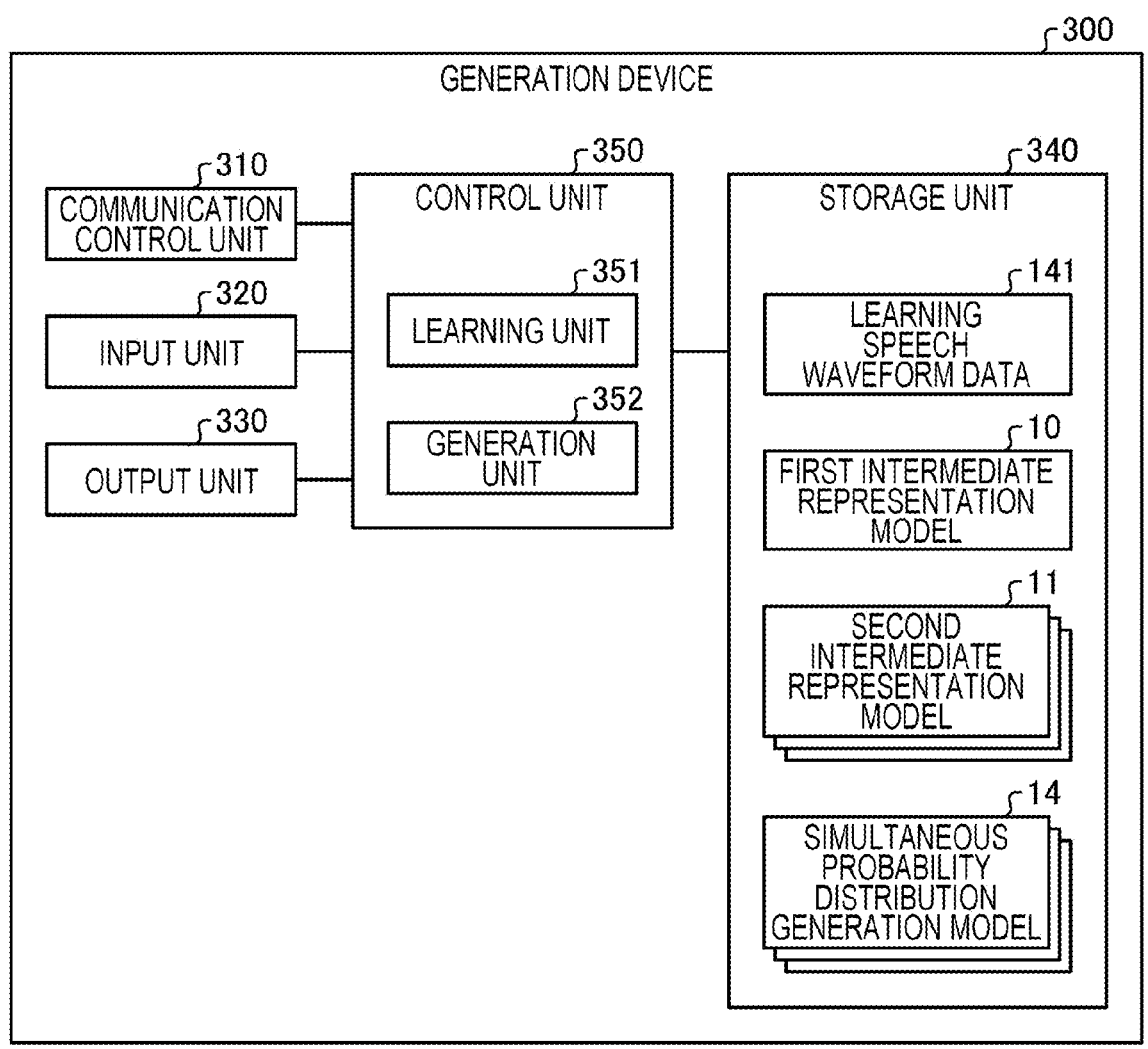
FIG. 12 is a functional block diagram illustrating a configuration of a generation device according to Example 3.

First, a configuration example of a generation device according to Example 3 will be described. FIG. 12 is a functional block diagram illustrating a configuration of a generation device according to Example 3. As illustrated in FIG. 12, a generation device 300 includes a communication control unit 310, an input unit 320, an output unit 330, a storage unit 340, and a control unit 350.

The description regarding the communication control unit 310, the input unit 320, and the output unit 330 is similar to the description regarding the communication control unit 110, the input unit 120, and the output unit 130 described in Example 1.

The storage unit 340 includes the learning speech waveform data 141, the first intermediate representation model 10, the second intermediate representation model 11, and a simultaneous probability distribution generation model 14. The storage unit 340 is realized by a semiconductor memory element such as a RAM or a flash memory, or a storage device such as a hard disk or an optical disk.

The learning speech waveform data 141, the first intermediate representation model 10, and the second intermediate representation model 11 are similar to the description regarding the learning speech waveform data 141, the first intermediate representation model 10, and the second intermediate representation model 11 described in Example 1.

The simultaneous probability distribution generation model 14 is a model that simultaneously estimates subband signals of channels b=1 to B of each time t=τ and τ+1. A dimension corresponding to each subband signal from the simultaneous probability obtained by the simultaneous probability distribution generation model 14 and each time is set as a probability distribution.

Here, the probability distributions output from the simultaneous probability distribution generation model 13 that simultaneously generates N samples described in Example 2 are expressed by Expression (3). For example, in the case of N=2, the subband signals of the channels b=1 to B at each time t=τ and τ+1 are estimated using the simultaneous probability distribution generation models 13-1 and 13-2.

[Math. 3]

$$P(s_{t=\tau, b=1,\ldots,B} | s_{t=1, b=1,\ldots,B}, \cdots s_{t=\tau-N, b=1,\ldots,B}, m), \ldots, \quad (3)$$
$$P(s_{t=\tau+N-1, b=1,\ldots,B} | s_{t=1, b=1,\ldots,B}, \cdots s_{t=\tau-N, b=1,\ldots,B}, m)$$

On the other hand, since the simultaneous probability distribution generation model 14 of Example 3 simultaneously estimates the subband signals of each time and the channels b=1 to B, the probability distributions output from the simultaneous probability distribution generation model 14 are expressed by Expression (4). As a result, it is possible to estimate the probability distribution in consideration of the relationship between the plurality of subbands.

[Math. 4]

$$P(s_{t=\tau, b=1,\ldots,B}, \cdots, s_{t=\tau+N-1, b=1,\ldots,B} | s_{t=1, b=1,\ldots,B}, \cdots s_{t=\tau-N, b=1,\ldots,B}, m) \quad (4)$$

In FIG. 12, the control unit 350 includes a learning unit 351 and a generation unit 352. The control unit 350 corresponds to a CPU or the like.

The learning unit 351 executes learning of the first intermediate representation model 10, the second intermediate representation model 11, and the simultaneous probability distribution generation model 14 using the learning speech waveform data 141.

The generation unit 352 generates a speech waveform from the acoustic feature value using the learned first intermediate representation model 10, second intermediate representation model 11, and simultaneous probability distribution generation model 14. The generation unit 352 may acquire the information of the acoustic feature value from the input unit 320 or from an external apparatus via the communication control unit 310.

Figure 13:
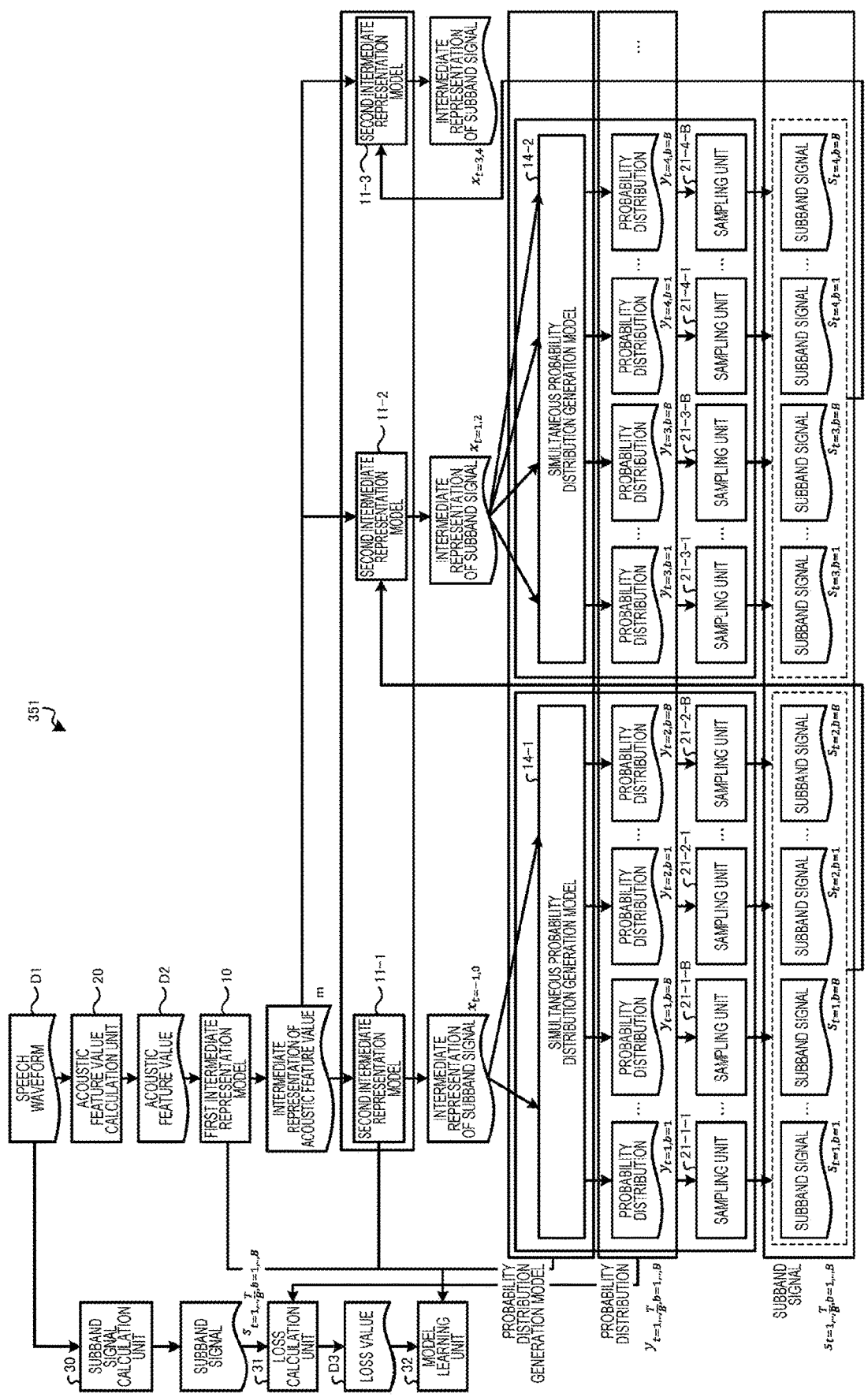
FIG. 13 is a diagram for describing a learning unit according to Example 3.

Next, the learning unit 351 illustrated in FIG. 12 will be specifically described. FIG. 13 is a diagram for describing a learning unit according to Example 3. As illustrated in FIG. 13, the learning unit 351 includes the acoustic feature value calculation unit 20, the first intermediate representation model 10, the plurality of second intermediate representation models 11-$n$ ($n=1$ to T/B −1), the plurality of simultaneous probability distribution generation models 14-$t$ ($t=1, \ldots, T/2B$), the sampling unit 21-$t$-$b$, the subband signal calculation unit 30, the loss calculation unit 31, and the model learning unit 32. Here, the sequence length of the speech is represented by T, the number of channels of the subband signal is represented by B, and the number of samples of the subband signal is represented by N ($=2$).

The learning unit 351 inputs the speech waveform D1 stored in the learning speech waveform data 141 to the acoustic feature value calculation unit 20. The acoustic feature value calculation unit 20 calculates an acoustic feature value D2 based on the speech waveform D1. The acoustic feature value calculation unit 20 inputs the acoustic feature value D2 to the first intermediate representation model 10.

The first intermediate representation model 10 outputs the intermediate representation m of the acoustic feature value in a case where the acoustic feature value D2 is input. The first intermediate representation model 10 outputs the intermediate representation m to the second intermediate representation models 11-1 to 11-$n$. The first intermediate representation model 10 outputs the gradient information to the model learning unit 32.

Each of the second intermediate representation models 11-1 to 11-$n$ outputs the intermediate representation $x_t$ of the subband signal in a case where the intermediate representation m is input. For example, the second intermediate representation model 11-1 calculates the intermediate representation $x_{t=-1,0}$, and outputs it to the simultaneous probability distribution generation model 14-1. Note that the second intermediate representation models 11-2 to 11-$n$ further use subband signals $s_{t,b}$ at the previous time when calculating the intermediate representation $x_t$ of the subband signal.

The second intermediate representation model 11-2 calculates the intermediate representation $x_{t=1,2}$, and outputs it to the simultaneous probability distribution generation model 14-2. The second intermediate representation model 11-3 calculates the intermediate representation $x_{t=3,4}$, and outputs it to the simultaneous probability distribution generation model 14-3 (not illustrated).

In the following description, in a case where the second intermediate representation models 11-1 to 11-$n$ are not distinguished, they are collectively referred to as the second intermediate representation model 11.

Each of the simultaneous probability distribution generation models 14-$t$ outputs the probability distributions $y_{t=t,t+1,b=1\ to\ B}$ in a case where the intermediate representation $x_t$ is input. For example, the simultaneous probability distribution generation model 14-1 outputs the probability distributions $y_{t=1,b=1\ to\ B}$ to the sampling units 21-1-1 to 21-1-B, and outputs the probability distributions $y_{t=2,b=1\ to\ B}$ to the sampling units 21-2-1 to 21-2-B.

The simultaneous probability distribution generation model 14-1 may output the probability distribution for each time and for each channel to the sampling units 21-1-1 to 21-1-B and 21-2-1 to 21-2-B, respectively, or the sampling units 21-1-1 to 21-1-B and 21-2-1 to 21-2-B may sample and acquire the corresponding probability distribution from the simultaneous probability distribution. For example, if a multivariate distribution is used, it is possible to sample the corresponding probability distribution from the simultaneous probability distribution. The same applies to other simultaneous probability distribution generation models described below.

The simultaneous probability distribution generation model 14-2 outputs the probability distributions $y_{t=3,b=1\ to\ B}$ to the sampling units 21-3-1 to 21-3-B, and outputs the probability distributions $y_{t=4,b=1\ to\ B}$ to the sampling units 21-4-1 to 21-4-B.

Although descriptions of other simultaneous probability distribution generation models are omitted, in a case where the intermediate representation $x_t$ is input, the probability distributions $y_{t,t+1,b=1\ to\ B}$ are output to the subordinate sampling unit. In the following description, in a case where the simultaneous probability distribution generation models 14 are not distinguished, they are collectively referred to as the simultaneous probability distribution generation model 14. The simultaneous probability distribution generation model 14 outputs the gradient information to the model learning unit 32. The simultaneous probability distribution generation model 14 outputs the probability distributions $y_{t=1\ to\ T/B,b=1\ to\ B}$ to the loss calculation unit 31.

Each of the sampling units 21-$t$-$b$ calculates the subband signals $s_{t,b}$ in a case where the probability distributions $y_{t,b}$ are input. Note that, in a case where each of the simultaneous probability distribution generation models 14 directly predicts the subband signal, the learning unit 351 may not use each of the sampling units 21-$t$-$b$.

Other descriptions regarding each of the sampling units 21-$t$-$b$ are similar to those of each of the sampling units 21-$t$-$b$ described in Example 1.

The subband signal calculation unit 30 calculates the subband signals $s_{t=1\ to\ T/B,b=1\ to\ B}$ from the speech waveform D1. The subband signal calculation unit 30 outputs the subband signals $s_{t=1\ to\ T/B,b=1\ to\ B}$ to the loss calculation unit 31. Other descriptions regarding the subband signal calculation unit 30 are similar to those of Example 1.

The loss calculation unit 31 calculates a loss value D3 based on the subband signals $s_{t=1\ to\ T/B,b=1\ to\ B}$ and the probability distributions $y_{t=1\ to\ T/B,b=1\ to\ B}$. The loss calculation unit 31 outputs the loss value D3 to the model learning unit 32. Other descriptions regarding the loss calculation unit 31 are similar to those of Example 1.

The model learning unit 32 acquires the loss value D3, the gradient information of the first intermediate representation model 10, the gradient information of the second intermediate representation model 11, and the gradient information of the simultaneous probability distribution generation model 14, and performs machine learning on the parameter of the first intermediate representation model 10, the parameter of the second intermediate representation model 11, and the parameter of the simultaneous probability distribution generation model 14 to reduce the loss value D3. For example, the model learning unit 32 executes machine learning using an error back propagation algorithm.

Each processing unit included in the learning unit 351 repeatedly executes the above processing on the plurality of speech waveforms D1 included in the learning speech waveform data 141 to obtain the learned first intermediate representation model 10, second intermediate representation model 11, and simultaneous probability distribution generation model 14.

Figure 14:
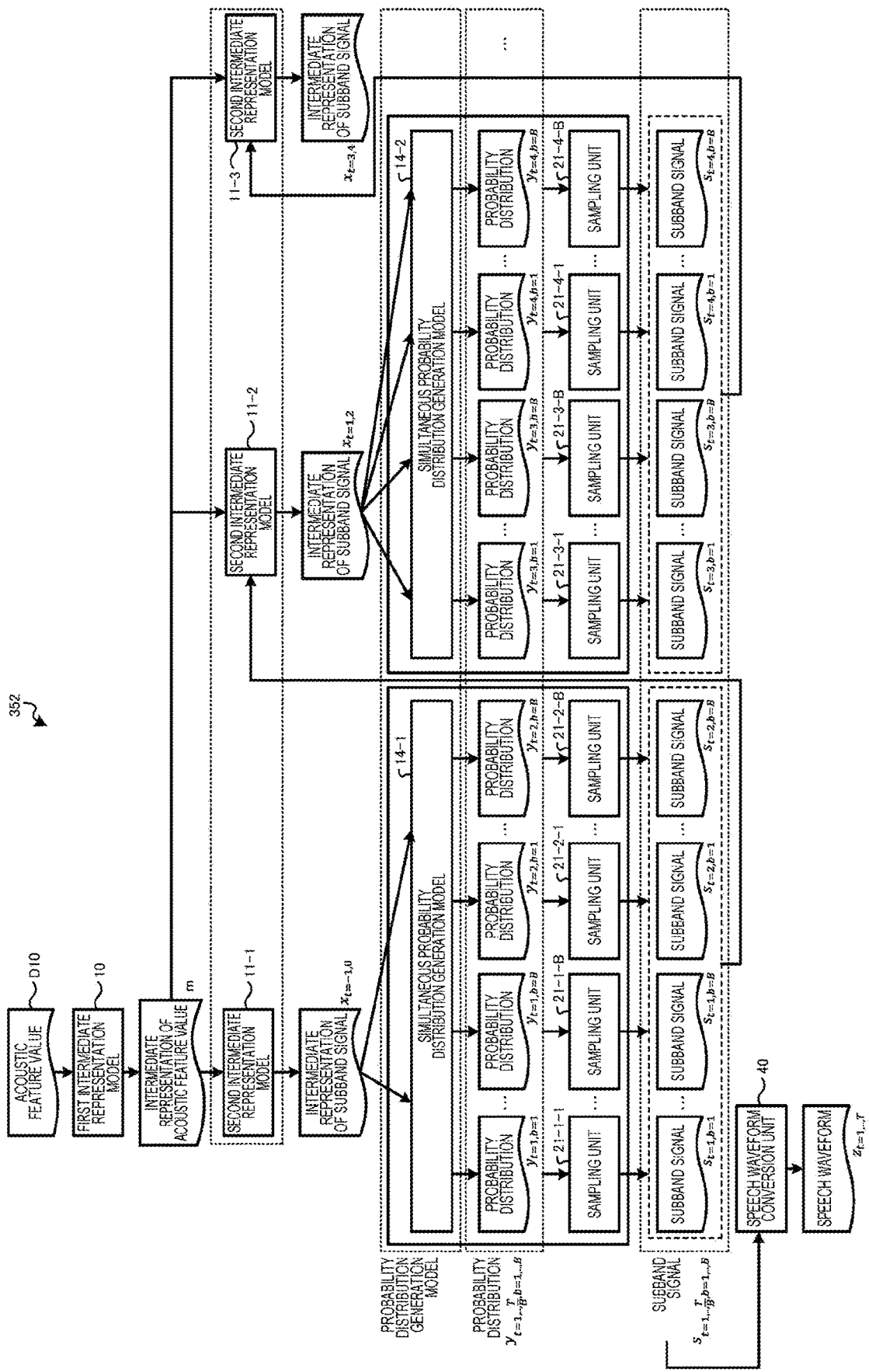
FIG. 14 is a diagram for describing a generation unit according to Example 3.

Next, the generation unit 352 illustrated in FIG. 12 will be specifically described. FIG. 14 is a diagram for describing a generation unit according to Example 3. As illustrated in FIG. 14, the generation unit 352 includes the first intermediate representation model 10, the plurality of second intermediate representation models 11-$n$ (n=1 to T/B −1), the plurality of simultaneous probability distribution generation models 14-$t$ (t=1, . . . , T/2B), the sampling unit 21-$t$-$b$, and the speech waveform conversion unit 40. Here, the sequence length of the speech is represented by T, the number of channels of the subband signal is represented by B, and the number of samples of the subband signal is represented by N (=2).

Similarly to the case of FIG. 13, in a case where the second intermediate representation models 11-1 to 11-$n$ are not distinguished, they are collectively referred to as the second intermediate representation model 11. In a case where the simultaneous probability distribution generation models 14-$t$ are not distinguished, they are collectively referred to as the simultaneous probability distribution generation model 14.

It is assumed that the first intermediate representation model 10, the second intermediate representation model 11, and the simultaneous probability distribution generation model 14 have been learned by the learning unit 351.

The generation unit 352 inputs the acoustic feature value D10 to the first intermediate representation model 10. The first intermediate representation model 10 outputs the intermediate representation m of the acoustic feature value in a case where the acoustic feature value D10 is input. The first intermediate representation model 10 outputs the intermediate representation m to the second intermediate representation models 11-1 to 11-$n$.

The second intermediate representation model 11 outputs the intermediate representation $x_t$ of the subband signal to the simultaneous probability distribution generation model 14 in a case where the intermediate representation m is input. The description regarding the second intermediate representation model 11 is similar to the description regarding each of the second intermediate representation models 11-1 to 11-$n$ performed in FIG. 13.

The simultaneous probability distribution generation model 14 outputs the probability distributions $y_{t,t+1,b=1\ to\ B}$ to each of the sampling units 21-$t$-$b$ in a case where the intermediate representation $x_t$ is input. The description regarding the simultaneous probability distribution generation model 14 is similar to the description regarding each of the probability distribution generation models 12-$t$ performed in FIG. 13.

The sampling units 21-$t$-$b$ calculate the subband signals $s_{t,b}$ in a case where the probability distributions $y_{t,b}$ are input. Each of the sampling units 21-$t$-$b$ outputs the subband signals $s_{t=1\ to\ T/B, b=1\ to\ B}$ to the speech waveform conversion unit 40.

The speech waveform conversion unit 40 calculates speech waveforms $z_{t=1\ to\ T}$ based on the subband signals $s_{t=1\ to\ T/B, b=1\ to\ B}$. The speech waveform conversion unit 40 converts the subband signal into an audio waveform by inverse conversion of the quadrature mirror filter or the pseudo-quadrature mirror filter.

Figure 15:
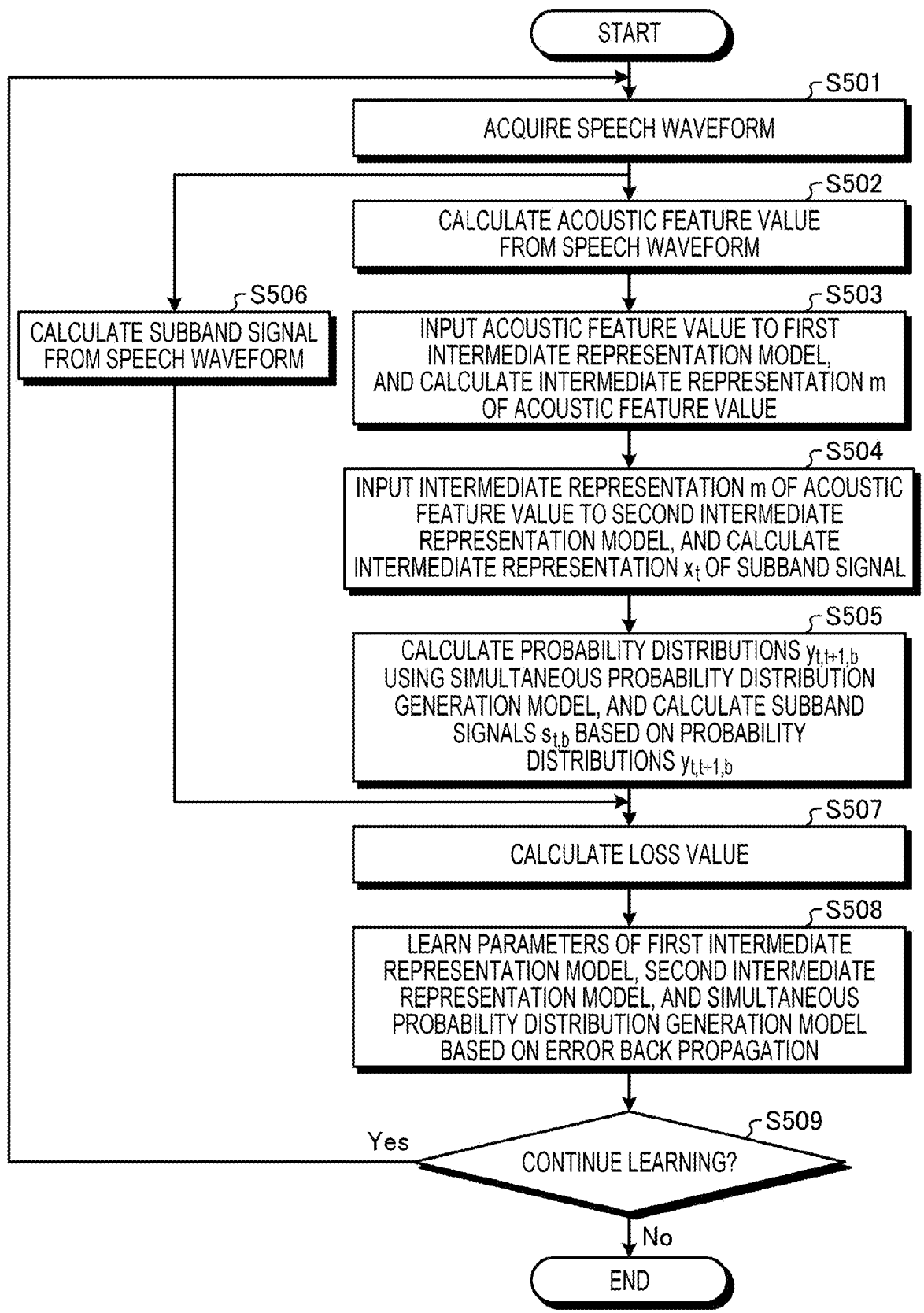
FIG. 15 is a flowchart illustrating a processing procedure at a time of learning of the generation device according to Example 3.

Next, an example of a processing procedure of the generation device 300 according to Example 3 will be described. FIG. 15 is a flowchart illustrating a processing procedure at a time of learning of the generation device according to Example 3. As illustrated in FIG. 15, the learning unit 351 of the generation device 300 acquires a speech waveform from the learning speech waveform data 141 (step S501).

The acoustic feature value calculation unit 20 of the learning unit 351 calculates an acoustic feature value based on the speech waveform (step S502). The learning unit 351 inputs the acoustic feature value to the first intermediate representation model 10 and calculates the intermediate representation m of the acoustic feature value (step S503).

The learning unit 351 inputs the intermediate representation m of the acoustic feature value to the second intermediate representation model 11 and calculates the intermediate representation $x_t$ of the subband signal (step S504). The learning unit 351 calculates the probability distributions $y_{t,t+1,b}$ using the simultaneous probability distribution generation model 14, and calculates the subband signals $s_{t,b}$ based on the probability distributions $y_{t,t+1,b}$ (step S505).

On the other hand, the subband signal calculation unit 30 of the learning unit 351 calculates the subband signal based on the speech waveform (step S506).

The loss calculation unit 31 of the learning unit 351 calculates a loss value based on the subband signals $s_{t=1\ to\ T/B, b=1\ to\ B}$ and the probability distributions $y_{t=1\ to\ T/B, b=1\ to\ B}$ (step S507).

The model learning unit 32 of the learning unit 351 learns the parameters of the first intermediate representation model 10, the second intermediate representation model 11, and the simultaneous probability distribution generation model 14 based on the error back propagation (step S508).

In a case where the learning is continued (step S509, Yes), the learning unit 351 proceeds to step S501. On the other hand, in a case where the learning is not continued (step S509, No), the learning unit 351 ends the processing.

Figure 16:
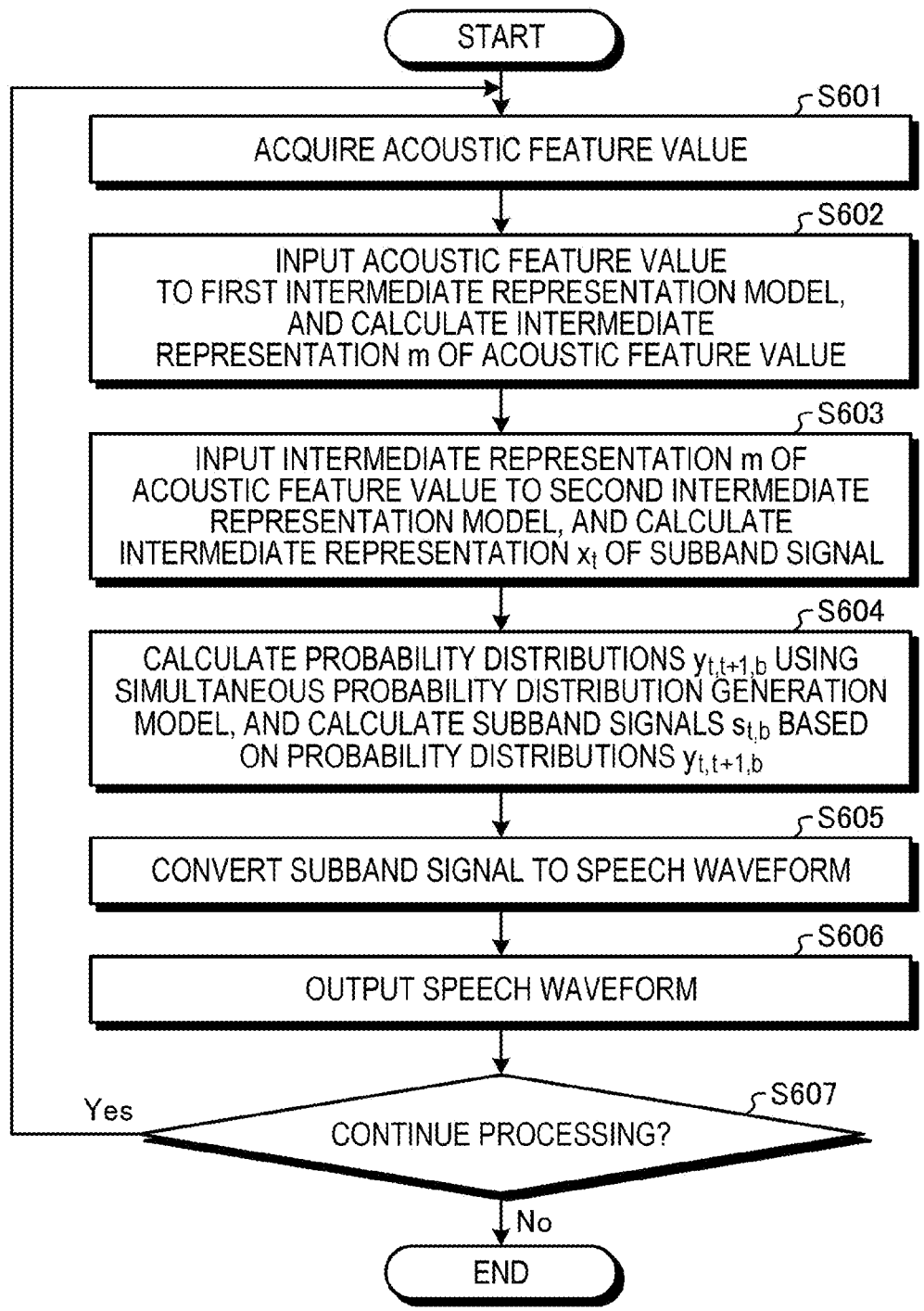
FIG. 16 is a flowchart illustrating a processing procedure at a time of generation of the generation device according to Example 3.

FIG. 16 is a flowchart illustrating a processing procedure at a time of generation of the generation device according to Example 3. As illustrated in FIG. 16, the generation unit 352 of the generation device 300 acquires an acoustic feature value (step S601). The generation unit 352 inputs the acoustic feature value to the first intermediate representation model 10 and calculates the intermediate representation m of the acoustic feature value (step S602).

The generation unit 352 inputs the intermediate representation m of the acoustic feature value to the second intermediate representation model 11 and calculates the intermediate representation $x_t$ of the subband signal (step S603). The generation unit 352 calculates the probability distributions $y_{t,t+1,b}$ using a simultaneous probability distribution generation model 15, and calculates the subband signals $s_{t,b}$ based on the probability distributions $y_{t,t+1,b}$ (step S604).

The speech waveform conversion unit 40 of the generation unit 352 calculates the speech waveforms $z_{t=1\ to\ T}$ based on the subband signals $s_{t=1\ to\ T/B, b=1\ to\ B}$ (step S605). The generation unit 352 outputs the speech waveforms $z_{t=1\ to\ T}$ (step S606).

In a case where the processing is continued (step S607, Yes), the generation unit 352 proceeds to step S601. In a case where the processing is not continued (step S607, No), the generation unit 352 ends the processing.

Next, effects of the generation device 300 according to Example 3 will be described. The generation device 300 simultaneously generates the B subband signals for each time by one forward propagation for N samples. As a result, the processing of generating the speech waveform from the speech feature value can be speeded up, and the number of times of calling the matrix computation instruction can be set to 1/(B×N) times at the minimum as compared with Example 1, which is also effective in terms of processing.

Figure 17:
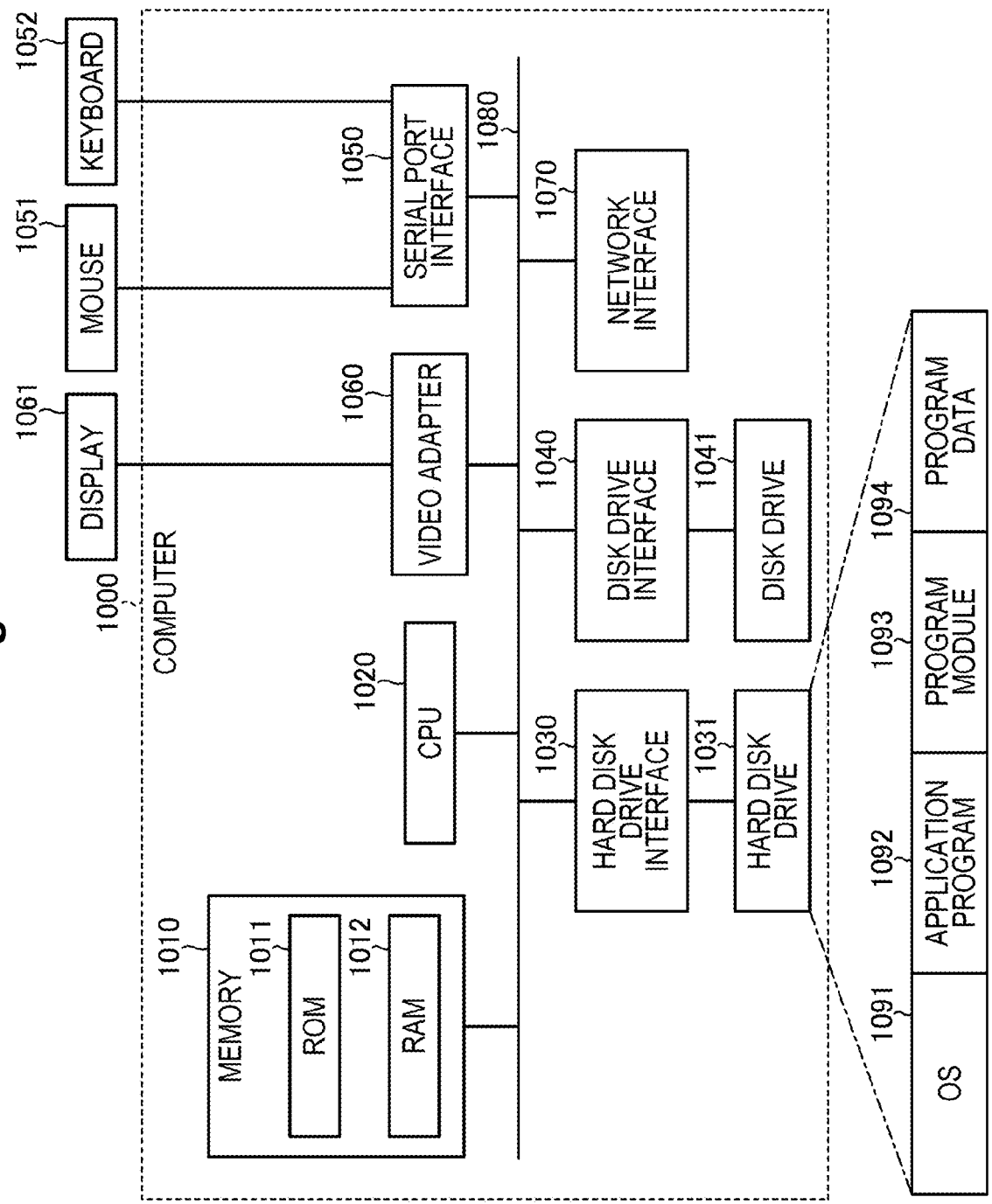
FIG. 17 is a diagram illustrating an example of a computer that executes a generation program.

Next, an example of a computer that executes a generation program will be described. FIG. 17 is a diagram illustrating an example of a computer that executes a generation program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other via a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A removable storage medium such as a magnetic disk or an optical disk, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. Each piece of information described in the above embodiment is stored in, for example, the hard disk drive 1031 or the memory 1010.

In addition, the generation program is stored in the hard disk drive 1031 as the program module 1093 in which commands to be executed by the computer 1000, for example, are described. Specifically, the program module 1093 in which each piece of the processing executed by the generation device 100 (200 and 300) described in the above embodiment is described is stored in the hard disk drive 1031.

In addition, data used for information processing performed by the generation program is stored as the program data 1094 in the hard disk drive 1031, for example. The CPU 1020 reads, into the RAM 1012, the program module 1093 and the program data 1094 stored in the hard disk drive 1031 as necessary and executes each procedure described above.

Note that the program module 1093 and the program data 1094 related to the generation program are not limited to being stored in the hard disk drive 1031, and may be stored in, for example, a removable storage medium and read by the CPU 1020 via a disk drive 1041 or the like. Alternatively, the program module 1093 and the program data 1094 related to the generation program may be stored in another computer connected via a network such as LAN or a wide area network (WAN), and may be read by the CPU 1020 via the network interface 1070.

Although the embodiment to which the invention made by the present inventor is applied has been described above, the present invention is not limited by the description and the drawings constituting a part of the disclosure of the present invention according to the present embodiment. In other words, other examples, examples, operational technologies, and the like made by those skilled in the art and the like based on the present example are all included in the scope of the present invention.

REFERENCE SIGNS LIST 100, 200, 300 Generation device
110, 210, 310 Communication control unit
120, 220, 320 Input unit
130, 230, 330 Output unit
140, 240, 340 Storage unit
150, 250, 350 Control unit
151, 251, 351 Learning unit
152, 252, 352 Generation unit

The invention claimed is:

1. A computer implemented method comprising:
generating intermediate representation information of a subband signal based on an acoustic feature value of a speech waveform;
simultaneously generating a plurality of subband signals corresponding to a plurality of different times and a plurality of different bands by inputting the intermediate representation information to a plurality of probability distribution generation models, wherein the plurality of probability distribution generation models outputs information on subband signals corresponding to times and bands allocated respectively, and the plurality of probability distribution generation models corresponds to a number of channels of the subband signals and a number of samples to be simultaneously generated; and
generating the speech waveform based on the plurality of subband signals.

2. The computer implemented method according to claim 1, further comprising:
converting the acoustic feature value of the speech waveform into the intermediate representation information of the acoustic feature value by using a first intermediate representation model, wherein the first intermediate representation model outputs the intermediate representation information of the acoustic feature value in a case where the acoustic feature value is input.

3. The computer implemented method according to claim 2, wherein the generating intermediate representation information further comprises generating the intermediate representation information of the subband signal using a second intermediate representation model, wherein the second intermediate representation model outputs the intermediate representation information of the subband signal in a case where the intermediate representation information of the acoustic feature value is input.

4. The computer implemented method according to claim 3, further comprising:
calculating a loss value based on the plurality of subband signals, wherein the plurality of subband signals is calculated from the speech waveform; and
executing learning of at least one model, wherein the at least one model is among the first intermediate representation model, the second intermediate representation model, and the plurality of probability distribution generation models based on the loss value.

5. The computer implemented method according to claim 2, wherein the first intermediate representation model includes a neural network.

6. The computer implemented method according to claim 1, wherein the simultaneously generating a plurality of subband signals further comprises generating the plurality of subband signals using a simultaneous probability distribution generation model, and the simultaneous probability distribution generation model simultaneously outputs information of subband signals corresponding to a plurality of time zones and a plurality of bands from one model.

7. The computer implemented method according to claim 1, wherein the intermediate representation information is in multi-dimensional vector form.

8. A computer-readable non-transitory recording medium storing a computer-executable program instructions that when executed by a processor cause a computer to execute operations comprising:
- generating intermediate representation information of a subband signal based on an acoustic feature value of a speech waveform;
- simultaneously generating a plurality of subband signals corresponding to a plurality of different times and a plurality of different bands by inputting the intermediate representation information to a plurality of probability distribution generation models, wherein the plurality of probability distribution generation model outputs information on subband signals corresponding to times and bands allocated respectively, and the plurality of probability distribution generation models corresponds to a number of channels of the subband signals and a number of samples to be simultaneously generated; and
- generating the speech waveform based on the plurality of subband signals.

9. The computer-readable non-transitory recording medium according to claim 8, the computer-executable program instructions when executed further causing the computer to execute operations comprising:
- converting the acoustic feature value of the speech waveform into the intermediate representation information of the acoustic feature value by using a first intermediate representation model, wherein the first intermediate representation model that outputs the intermediate representation information of the acoustic feature value in a case where the acoustic feature value is input.

10. The computer-readable non-transitory recording medium according to claim 9, wherein the generating intermediate representation information further comprises generating the intermediate representation information of the subband signal using a second intermediate representation model, wherein the second intermediate representation model outputs the intermediate representation information of the subband signal in a case where the intermediate representation information of the acoustic feature value is input.

11. The computer-readable non-transitory recording medium according to claim 10, the computer-executable program instructions when executed further causing the computer to execute operations comprising:
- calculating a loss value based on the plurality of subband signals, wherein the plurality of subband signals is calculated from the speech waveform; and
- executing learning of at least one model, wherein the at least one model is among the first intermediate representation model, the second intermediate representation model, and the plurality of probability distribution generation models based on the loss value.

12. The computer-readable non-transitory recording medium according to claim 9, wherein the first intermediate representation model includes a neural network.

13. The computer-readable non-transitory recording medium according to claim 8, wherein the simultaneously generating a plurality of subband signals further comprises generating the plurality of subband signals using a simultaneous probability distribution generation model, and the simultaneous probability distribution generation model simultaneously outputs information of subband signals corresponding to a plurality of time zones and a plurality of bands from one model.

14. The computer-readable non-transitory recording medium according to claim 8, wherein the intermediate representation information is in multi-dimensional vector form.

15. A device comprising a processor configured to execute operations comprising:
- generating intermediate representation information of a subband signal based on an acoustic feature value of a speech waveform;
- generating a plurality of subband signals corresponding to a plurality of different times and a plurality of different bands by inputting the intermediate representation information to a plurality of probability distribution generation models, wherein the plurality of probability distribution generation models outputs information on subband signals corresponding to times and bands allocated respectively, and the plurality of probability distribution generation models corresponds to a number of channels of the subband signals and a number of samples to be simultaneously generated; and
- generating the speech waveform based on the plurality of subband signals.

16. The device according to claim 15, further comprising:
- converting the acoustic feature value of the speech waveform into the intermediate representation information of the acoustic feature value by using a first intermediate representation model, wherein the first intermediate representation model that outputs the intermediate representation information of the acoustic feature value in a case where the acoustic feature value is input.

17. The device according to claim 16, wherein the generating intermediate representation information further comprises generating the intermediate representation information of the subband signal using a second intermediate representation model, wherein the second intermediate representation model outputs the intermediate representation information of the subband signal in a case where the intermediate representation information of the acoustic feature value is input.

18. The device according to claim 17, further comprising:
- calculating a loss value based on the plurality of subband signals, wherein the plurality of subband signals is calculated from the speech waveform; and
- executing learning of at least one model, wherein the at least one model is among the first intermediate representation model, the second intermediate representation model, and the plurality of probability distribution generation models based on the loss value.

19. The device according to claim 15, wherein the simultaneously generating a plurality of subband signals further comprises generating the plurality of subband signals using a simultaneous probability distribution generation model, and the simultaneous probability distribution generation model simultaneously outputs information of subband signals corresponding to a plurality of time zones and a plurality of bands from one model.

20. The device according to claim 15, wherein the intermediate representation information is in multi-dimensional vector form.

* * * * *